United States Patent [19]

Trethewey

[11] Patent Number: 4,466,088

[45] Date of Patent: Aug. 14, 1984

[54] GALVO POSITION SENSOR FOR TRACK SELECTION IN OPTICAL DATA DISK SYSTEM

[75] Inventor: Paul M. Trethewey, Tarzana, Calif.

[73] Assignee: Burroughs Corporation, Detroit, Mich.

[21] Appl. No.: 332,496

[22] Filed: Dec. 21, 1981

[51] Int. Cl.³ .............................................. G11B 7/00
[52] U.S. Cl. ...................... 369/46; 369/55; 369/111
[58] Field of Search .............. 250/201, 234, 235, 239; 365/215, 234; 369/32, 33, 30, 31, 41, 43, 44, 45, 46, 53, 54, 55, 56, 57, 101, 106, 108, 111, 120, 121, 122; 358/342, 907

[56] References Cited

U.S. PATENT DOCUMENTS

| 2,237,902 | 4/1941 | Dimmick | 369/54 |
| 4,264,809 | 4/1981 | Fearnside | 250/201 |
| 4,290,122 | 9/1981 | Bates et al. | 365/234 |
| 4,330,880 | 5/1982 | Van Dijk | 369/32 |
| 4,352,984 | 10/1982 | Ohara | 250/234 |
| 4,363,116 | 12/1982 | Kleuters et al. | 369/30 |

OTHER PUBLICATIONS

Paul M. Trethewey, "An Infra-Red Based Beam Scanner Position Sensor", Wescon Electronic Show & Convention, Sep. 15-17, 1981, Brooks Hall & Civic Auditorium, Hilton Hotel, San Francisco, California, Region 6, IEEE Student Paper Competition, pp. 1-8.

Primary Examiner—Donald McElheny, Jr.
Attorney, Agent, or Firm—John J. McCormack; Nathan Cass; Kevin R. Peterson

[57] ABSTRACT

Disclosed is a radiant energy optoelectronic position monitor system which detects the angular position of a "galvanometer mirror" (beam scanner) used in an optical disk memory arrangement. Using a single infra-red monitor beam, angular motion is converted to linear displacement of an image on a detector cell so as to produce a corresponding electrical signal. This signal is presented to a processing circuit with an analog divider to normalize output scale factor. The result is a high gain electrical circuit for recovering output signals in an environment with strong magnetic interference.

22 Claims, 26 Drawing Figures

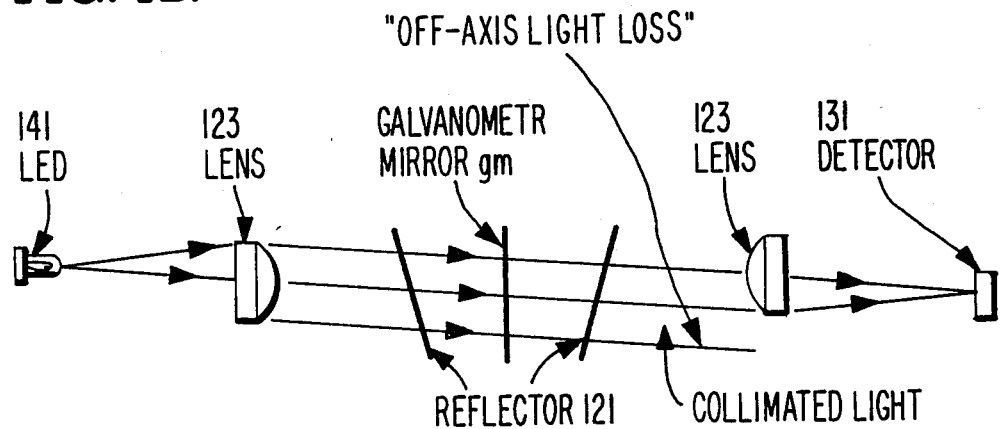
FIG. 4B.
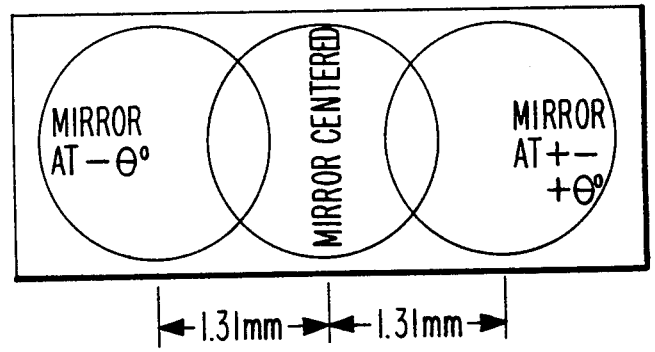
FIG. 5.
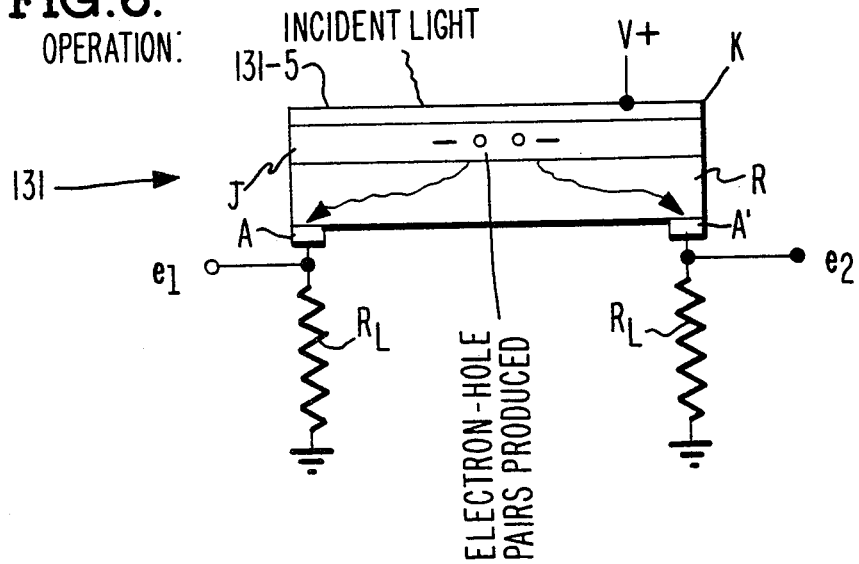
FIG. 6. OPERATION:

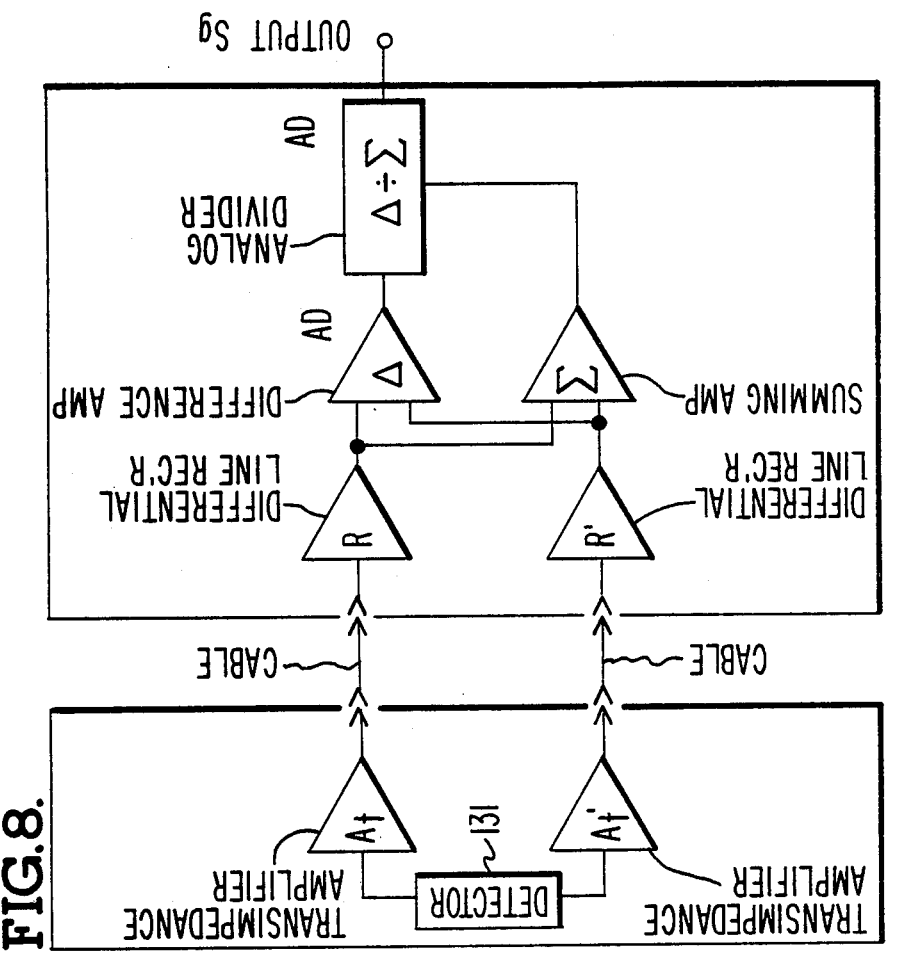

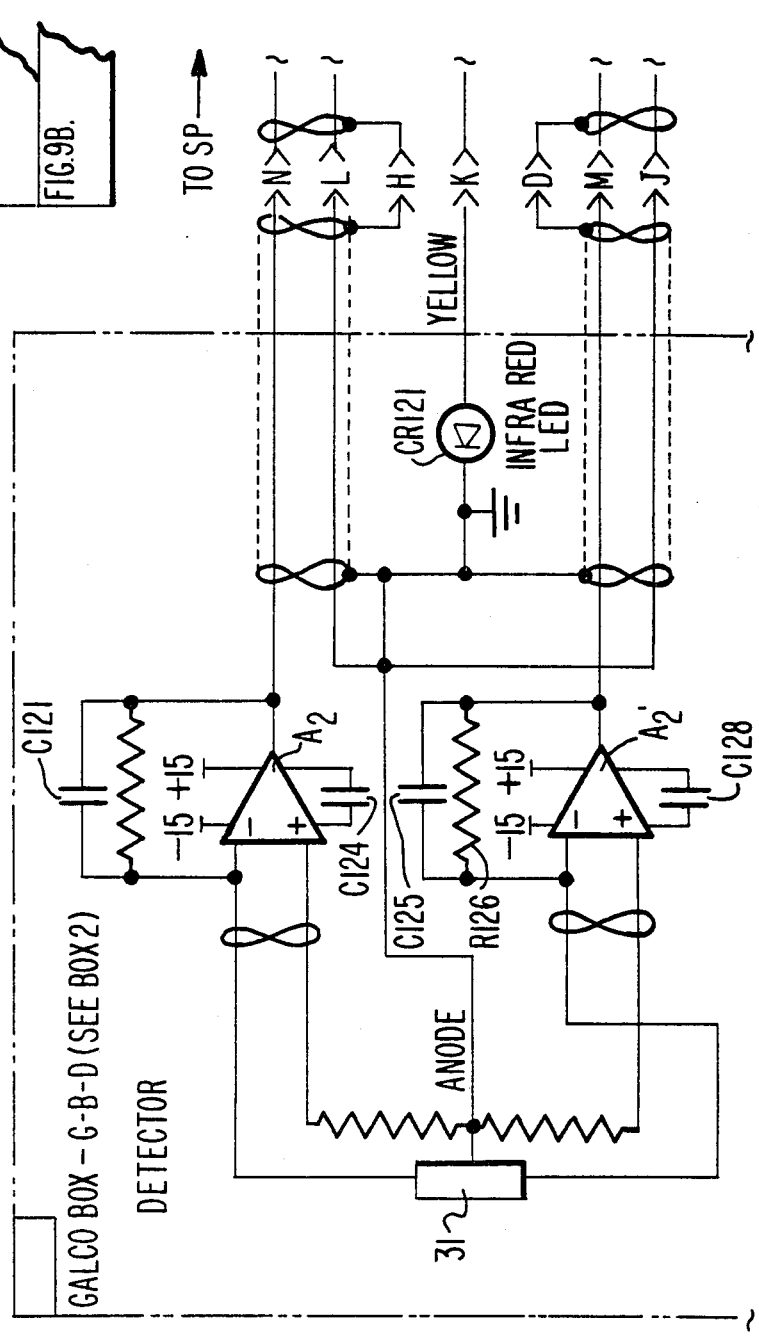

GALVO POSITION SENSOR FOR TRACK SELECTION IN OPTICAL DATA DISK SYSTEM

BACKGROUND OF THE INVENTION

The present invention relates generally to improved means and methods for optically recording and/or reading data, on disks and more particularly to improved means and methods for selecting and following data tracks thereon.

In recent years considerable effort has been expended to develop improved methods and apparatus for optically recording and reading on a suitable medium because of the unusually high recording density potential offered by optical recording. Examples of various known methods and approaches are revealed in the following references:

| U.S. Pat. No. | Date Issued | Inventor(s) |
| --- | --- | --- |
| 4,216,501 | 8/5/80 | Bell |
| 4,222,071 | 9/9/80 | Bell, et al |
| 4,232,337 | 12/4/80 | Winslow, et al |
| 4,243,848 | 1/6/81 | Utsumi |
| 4,243,850 | 1/6/81 | Edwards |
| 4,253,019 | 2/24/81 | Opheij |
| 4,253,734 | 3/3/81 | Komurasaki |
| 4,268,745 | 5/19/81 | Okano |

PUBLICATIONS

R. A. Bartolini, et al., "Optical Disk Systems Emerge", IEEE Spectrum, August 1978, pp. 20–28.

G. C. Kenney, et al., "An OpticaL Disk Replaces 25 Mag Tapes", IEEE Spectrum, February 1979, pp. 33–38.

K. Bulthuis, et al., "Ten Billion Bits on a Disk", IEEE Spectrum, August 1979, pp. 26–33.

R. Michael Madden, "Silicon Position Sensing Detectors for Precision Measurement and Control", SPIE, Vol 153, Advances in Optical Metrology (1978).

Robert M. White, "Disk-Storage Technology", Scientific American, 243: 138–148 (August, 1980).

The subject matter of these references is to be considered as incorporated herein to the extent relevant.

SUMMARY OF THE PRESENT INVENTION

The primary purpose of the present invention is to provide significantly improved methods and apparatus over those disclosed in the foregoing references for optically recording and/or reading data from an optical storage medium.

One disk memory storage technique uses a system of lenses and mirrors to focus a laser beam onto a rotating disk D coated with a thin layer of metal as shown in FIG. 1. Data is recorded on the disk by forming concentric tracks of microscopic holes in the metallic layer with a powerful, focused beam; data is read back by passing a less powerful beam over the data tracks and detecting the intensity changes in the reflected light. This technique allows data densities many times greater than magnetic disk memories, but the microscopic nature of the storage medium requires a correspondingly precise method of positioning the focused laser beams.

The final beam-positioning element in the lens and mirror system is a galvanometer, or "galvo", G, an electromagnetically pivoted mirror $g_m$ that scans the laser beam radially on the disk [while the entire galvo unit G is to be reciprocated across disk-tracks for "coarse seek" of track location—the tilting of mirror $g_m$ providing "fine-seek"]. For closed-loop operation of the "beam position control system", it is necessary to communicate to the control system a feedback signal indicating the angular position of the galvo mirror. Such a control system should enhance the accuracy and response time of the beam position; also the effects of cross-coupling from nearby linear motors and other disturbance sources should be minimized. This invention is intended to teach such an improved control system.

One objective hereof is to provide better "control feedback", i.e., to teach the use of a position sensor to determine the angle a galvo mirror is pivoted [relative to the chassis on which it is mounted].

Such a position detector is preferably operated with an infra-red beam reflected by the galvo mirror through a simple lens arrangement to detect the mirror's angular position. This optical approach is advantageous over magnetic or capacitive transducers in that (a) it is immune, in principle, to electrostatic and magnetic interference caused by the focus motor and (b) the infra-red optical system can be distinguished from the laser beam while also made an analog of the laser's optical system, wherein galvo mirror rotation results in a lateral shift of a focused spot on a flat surface.

A "folded" optical system with a fixed, secondary mirror can allow the galvo mirror to be located optimally close to the focus motor and its contained lens system, make the assembly compact, and avoid blocking the laser beam.

To provide shielding from ambient light sources and from magnetic fields, the assembly can be enclosed in a mu-metal box.

In a particular preferred embodiment of the present invention, the reliability and accuracy of optical recording and reading with respect to a rotating optical disk is significantly enhanced by the employment of such a position-sensor unit which functions in conjunction with a three-beam laser arrangement and read signal processing electronic circuitry so as to provide significantly improved and more accurate control over recording and reading operations.

The specific nature of the invention as well as other objects, advantages, features and uses of the invention will become evident from the following description of a preferred embodiment taken in conjunction with the accompanying drawings.

BRIEF DESCRIPTION OF THE DRAWINGS

FIGS. 2 and 3 show a preferred embodiment in plan and side simplified view respectively; while FIG. 4A is a simplified tracing of the related "monitor rays" and FIG. 4B shows the same for an "unfolded" array;

FIG. 6 is a very simplified side view of the preferred detector for the embodiment of FIGS. 2–4, with an enlarged plan view thereof in FIG. 5 and electrical circuit model thereof in FIG. 7;

FIG. 8 is a block diagram of a preferred utilization system apt for use with the embodiment above, while FIGS. 9 (9A, 9B) and 10 (10A–10F) are preferred circuit elaborations thereof;

FIG. 12 is a modification of the FIG. 2 embodiment in similar view, while

DETAILED DESCRIPTION OF EMBODIMENTS

Figure 1:
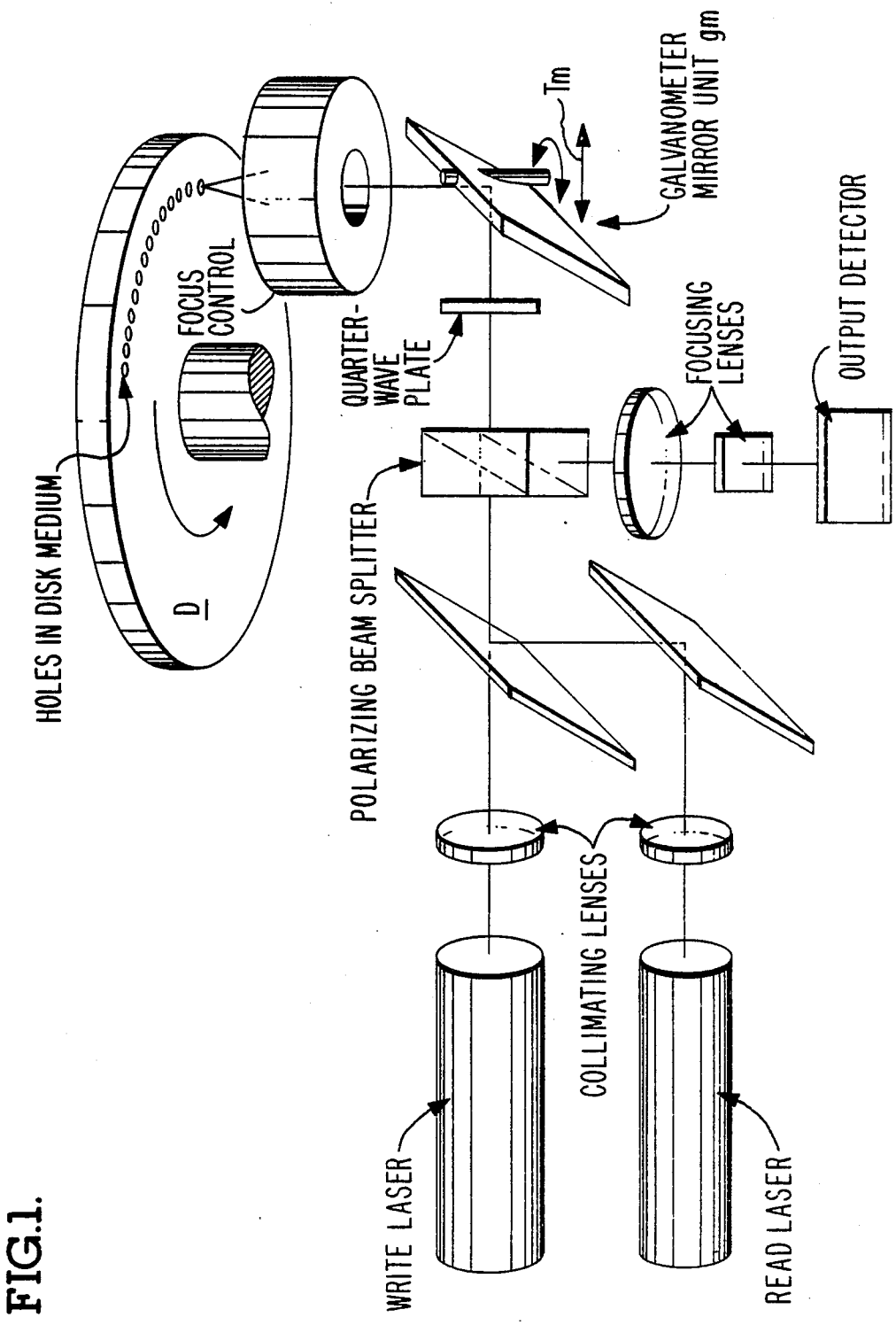
FIG. 1 is a simplified block diagram showing an optical disk memory arrangement apt for using the invention.
Figure 2:
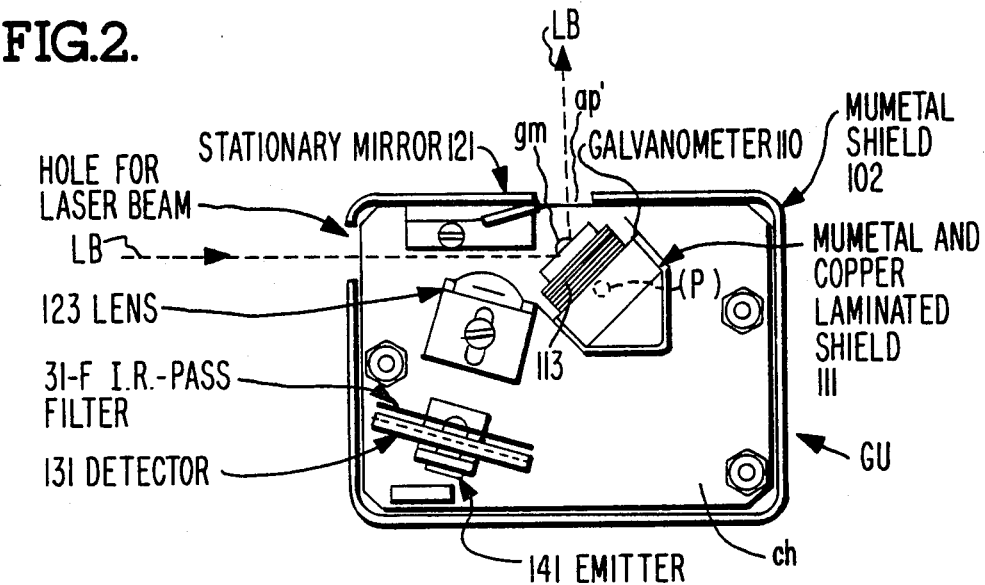
Figure 3:
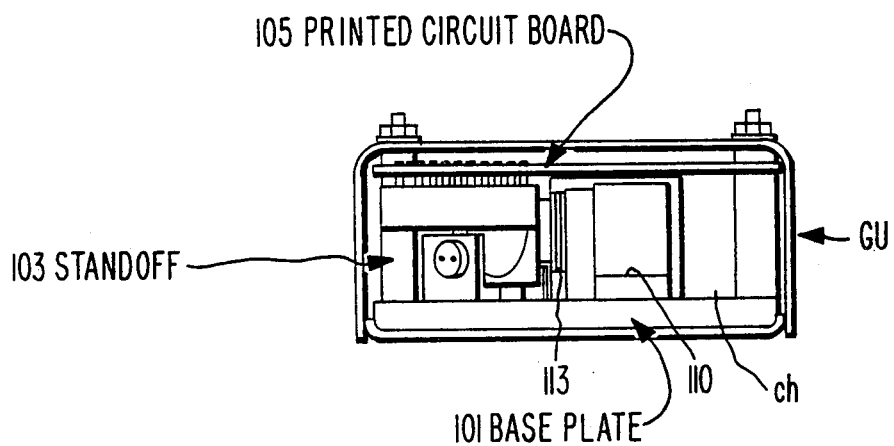

FIGS. 2 and 3 show a preferred embodiment of a position sensor unit GU adapted to determine the angular orientation of a galvo mirror $g_m$ as it is pivoted relative to an associated galvo chassis ch and to provide a correlative feedback signal ($s_g$) to related means for controlling mirror position. This arrangement will be understood as especially adapted for operational association with certain Optical Disk Memory (CDM) units (e.g., like that described below and shown in FIGS. 14–20). The galvo mirror $g_m$ will be understood as accommodating beam scanning radially across the disk for track selection/centering (e.g., "track-seek", "track-follow" in conjunction with translator means tm FIG. 1) as known in the art, these are typically controlled to compensate for variances in disk position (runout correction).

And, except as otherwise specified, all materials, methods and devices and apparatus herein will be understood as implemented by known expedients according to present good practice.

Thus, unit GU will be understood as providing mirror $g_m$ positioned to receive and redirect laser beams (e.g., about 1–2 mm diameter) along a prescribed path (see path LB—LB through apertures ap, ap' in chassis ch, FIG. 2), being pivoted by conventional galvanometer means 10, including a coil means 13 (e.g., a pair of 150 gauss coils mounted with mirror $g_m$ (e.g., 10×13 mm) on a frame (preferably plastic with a mu-metal and copper shield 11) to make up galvo unit 10.

To provide shielding from ambient light and from stray magnetic fields (e.g., produced by nearby focus motor), the assembly is enclosed in a mu-metal box, 2 within which a baseplate 1 is affixed to mount unit 10 and the other components.

Galvo mirror $g_m$ has a mechanical neutral position which it assumes when no current flows in the coil. The plastic chassis of the galvo is provided with a locating lug, whose axis is approximately collinear with that of the galvo mirror. During alignment, the galvo is pivoted about this lug so that the laser beam is centered in the objective when the galvo coil is unenergized. This minimizes the current and heat in the galvo coil during normal operation.

Typically mirror $g_m$ is designed as a "good" reflector of the laser radiation (e.g., typically at 6330 Å)—and accordingly should be expected to be a relatively "poor" reflector of infra-red (e.g., the 9200 Å specified below would be only ~25% reflected, necessitating a relatively high-intensity IR source). Otherwise adjustments may be made to improve IR reflectance.

Now, workers will appreciate that there are various known, conventional ways to monitor the position of galvo mirror $g_m$. One would be to attach magnetic flux means to one or several points along the mirror and detect positional-shift thereof with associated fixedly-disposed "Hall Effect Sensors". A related method would be to dispose capacitor plates on mirror $g_m$ and confronting fixed plates coupled to electronic means to detect mirror movement (inter-plate gap change) as a function of changes in inter-plate capacitance. Another distantly related arrangement is the Reticon optical detector used with television cameras whereby a multi-segment (256 unit) monolithic chip monitors the position-changes of an image moving across the segments and, using clock means, shifts-out an image-produced signal as serial data much as with a standard "shift register". This is very, very expensive however.

IR position-monitor:

According to a feature hereof, unit GU is also provided with optical (reflector) means for monitoring the angular position of mirror $g_m$ preferably in the form of an IR source, a fixed reflector, an associated IR detector and intermediate focus means. [Note IR emitter 41, reflector 21, IR detector 31 with filter 31-F and intermediate focusing lens 23 in FIG. 2].

Thus, the position detector can use the infra-red beam directed by its reflector 21 to be reflected by the galvo mirror $g_m$ through a simple lens arrangement 23 to detect the angular position of $g_m$. This optical approach is advantageous in it is immune (in principle) to electrostatic and magnetic interference which usually abound in the region of the focus motor; also the optical system can be made an analog of the laser's optical system, wherein galvo mirror rotation results in a lateral shift of a focused spot on a flat surface.

Figure 4A:
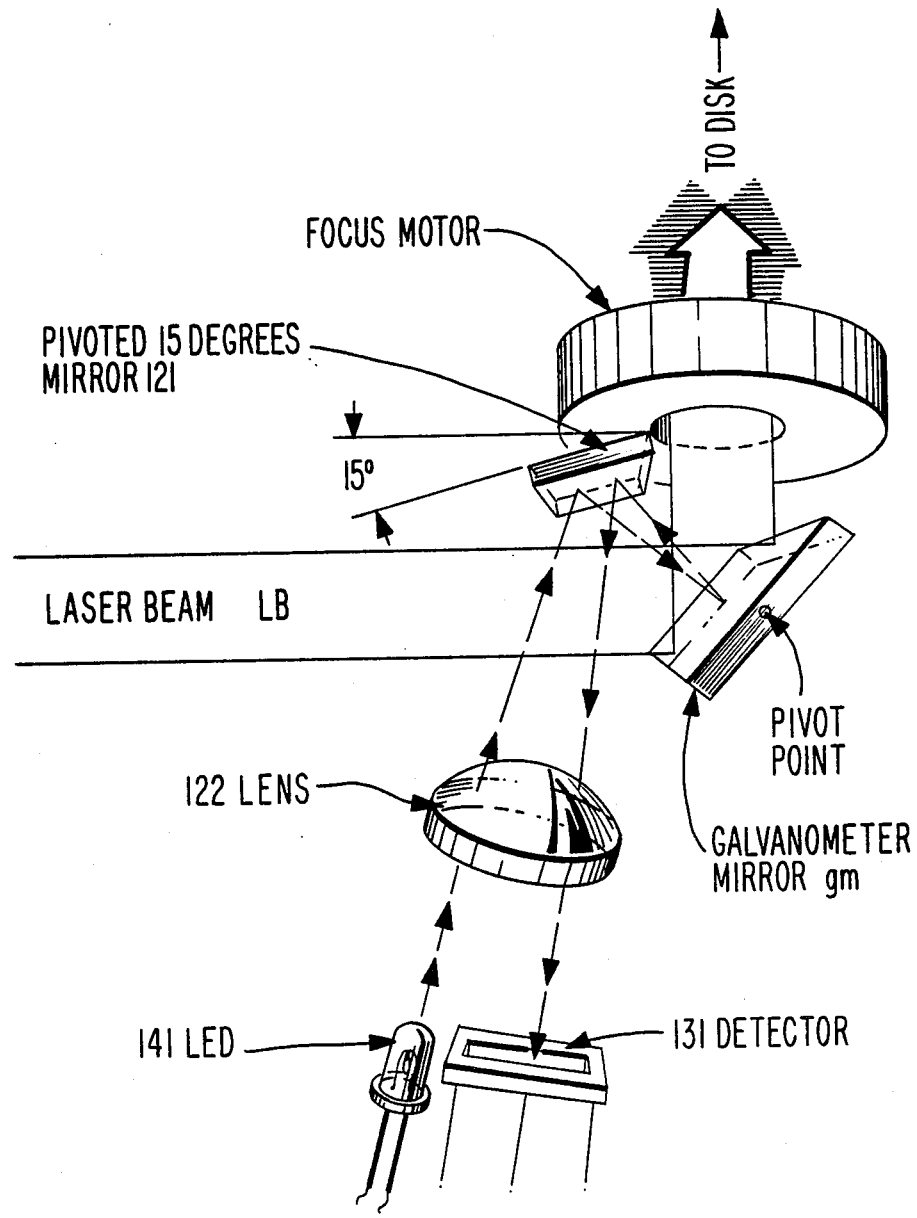

A "folded" optical system with fixed IR reflector 21 (see FIG. 4A) allows the galvo mirror to be located close to the focus motor and final laser objective, while keeping the assembly compact and avoiding blocking of the laser beam.

And preferably, reflector 21 can be adjustably pivoted (during calibration) to adjust alignment of the infra-red beam. This adjustment establishes the mechanical angular offset of the position detector. With the laser beam aimed as described above (galvo coil-current being "zero"), the reflector is adjusted for a circuit signal output ($S_g$) of zero. (FIG. 8). When properly adjusted, infra-red light emanates from the infra-red emitting diode (IRED), through the plano-convex lens, to the reflector, to the galvo mirror, and then (symmetrically) back through the reflector and lens to form an image of the IRED on the center of the detector. The IRED and detector surfaces are placed in the focal plane of the lens so that light emerging from the other side is collimated in parallel rays. Thus, the total distance between lens and galvo mirror will not substantially affect the image location. However, any pivoting of the galvo mirror changes the wavefront relationships of the collimated beam and results in the image being shifted laterally in the direction of the beam deflection, (see FIG. 5).

FIG. 4B shows this array (IRED 41, lens 23, reflector 21, mirror $g_m$ and detector 31) in an "unfolded" state to facilitate ray tracing. The infra-red source 41 is placed in the focal plane of the lens 23 so that light emerges through the other side of the lens in collimated rays. When the collimated light re-enters the lens after being reflected by the mirror system, it converges at the focal plane to form an image of the light source there, at detector 31.

The result of galvo mirror deflection (angle $\theta$) is that the image is shifted laterally (distance d) in the direction of beam deflection. Thus, one may describe this as $d = f \, 2\theta$, where f is the focal length of the lens, detector 31 is thus intended to detect shift of mirror angle as converted to linear position-displacement.

One preferred detector element 31 is a "lateral cell" position detector as further described (e.g., see description in publication by R. M. Madden, cited above). "Lateral cells" are available (e.g., in single or dual-axis configuration. Lateral cells have one, continuous, extended active area. The difference between a lateral cell and other photodetectors is that signal currents do not flow through the silicon chip to be collected at the back side; rather they flow laterally until collected at ohmic contacts located around the periphery of the active area.

When a spot of light illuminates a region of the active area of a lateral cell, a small local forward bias is induced at the illuminated region of the junction. This forward bias causes ohmic currents to flow to each of the collecting contacts (cathodes). The fraction of the total signal current collected at the j th contact is given by:

$$\frac{i_j}{j_{total}} = \frac{Y_j}{\Sigma_j Y_j} \quad \text{(Eq. 1)}$$

j=1,2 (single axis)
j=1,2,3,4 (dual axis)

$Y_j$ in Eq.1 represents the conductance from the point of illumination to the j th cathode. It is simply the inverse of the silicon substrate resistance between these points. Since the substrate resistance between the spot and a given cathode is (in the one dimensional approximation) inversely proportional to the distance between the spot and that cathode, expressions for normalized transfer functions in each axis are:

$$\bar{x} = \frac{\Delta_x}{\Sigma_x} \; ; \; \bar{y} = \frac{\Delta_y}{\Sigma_y} \quad \text{(Eq. 2)}$$

In Eq. 2, $\Delta_{x,y}$ represents the difference between currents collected by cathodes lying in the x (y) axis. $\Sigma_{x,y}$ represents the sum of the currents collected by the cathodes lying in the x (y) axis.

Lateral cells come close to the ideal linear characteristic. This is especially true of the single-axis device. It appears that nearly all deviations from linearity observed in lateral cells are associated with the failure of a one dimensional geometrical model in relating current signal to position. Their dynamic operating range is independent of spot size (excluding edge obscuration effects). Linearity and absolute measurement accuracy is also independent of spot size and uniformity characteristics to first order. Other advantages include excellent linearity, large operating range, and electronically adjustable null.

The cell's output signal is directly proportional to the location of the "optical centroid" (equivalent to the averaged intensity-center here), of the light pattern falling on the lateral cell's active silicon area. Since the outputs react to the "centroid" of the light, the image falling on the detector need not be sharply focused or of uniform intensity, as long as it stays consistent as the beam is scanned.

FIG. 5 illustrates the effect of lens focal length on image position. For example with a 25 mm lens f/2 23 used (to reduce system size and to utilize the center of the active area, which should have better linearity than the extremes) an image about 1.85 mm diameter could shift about 1.3 mm ($\theta = \pm 1.5°$) across the lateral cell face 31-S (here assume active area: $2 \times 5$ mm). Note that as more room is available for optical system, a larger area and longer lenses will be feasible.

A preferred source 41 is a 12 mW LED (Litronix model LD 271) with a diffuser type lens and no virtual image. This gives (with lens 23) an image 1.85 mm (diameter) falling on the detector's active area. To overcome light losses in the optical system, a powerful infrared emitting diode is chosen. This Litronix lateral cell (LD 271) is a 12 milliwatt device having a diffuser lens which proved ideal for this application. IRED's having clear (built-in) lenses were rejected because their lenses create a virtual image of the light source behind the IRED package (also enlarged).

The length of cell 31 should, of course, span that of the maximum expected image-displacement while its height should cover image-height, ($2 \text{ mm} \times 5$ mm adequate here for spot diameter of 1.85 mm). Linearity may be kept to a fraction of 1% expecially where operating range is compressed; also a "slit-image" is preferred to a relatively circular "spot". Also, a dual-axis lateral cell may be used where "height-displacement" information is also desired, as workers will appreciate.

Focal length of the system lens is chosen to meet available space restrictions and to result in a usable image of the IRED and sufficient image shift for a strong signal from the detector. The 25 mm, f/2 lens used here focused an image of the IRED 1.85 mm in diameter and resulted in a lateral shift of $\pm 1.31$ mm when the galvo mirror was pivoted through its $\pm 1.5°$ required range. Since the detector active area was 2 mm high by 5 mm wide, the image fit nicely on the detector with adequate margin for mechanical error.

The mentioned "lateral cell" position detector is illustrated in FIG. 6, with a representative circuit showing in FIG. 7. Workers will recognize cell 31 as comprising a cathode k superposed on a junction region J which in turn rests upon a "distributed resistance" zone R from which anodes A, A' project. When light energy falls onto the active silicon area (surface 31-S of cathode k) of the lateral cell, electron-hole pairs are created and a very small current flows through the resistive backplane R of the cell to anodes A,A' (two ohmic contacts) located at opposite edges of the backplane. The differential current from these two contacts is proportional to the location of the "optical centroid" of the light pattern falling on the active area and thus the angular position of the galvo mirror. Since the outputs react to the centroid of the light, the image falling on the detector need not be sharply focused or of uniform intensity. This reduces the accuracy burden on the optical system.

FIG. 7 is a theoretical, electrical model of the lateral cell 31. The magnitude of the current source is proportional to the total light energy falling on the detector. The position of the "potentiometer wiper" represents the position of the impinging light beam on the detector. Bandwidth of the cell is determined by the internal capacitance of the device and the resistance seen by that capacitance. (When the wiper shown is at center position, one model detector used, a Silicon Detector Corporation model SD-200-21-21-391—has a bandwidth of 222 KHz—note capacitance $c=160$ pF, $R_2=18$ K-ohm, plus "very large" $R_1$ and wiper as "centered"—thus $f=1/2R_1c$).

FIG. 8 is a block diagram of the electrical signal processing system. Two transimpedance amplifiers $A_t$, $A'_t$ (not shown in FIGS. 2,3) are contained with the detector 31 inside the mu-metal enclosure 2, mounted on the translator. They convert the (preamplified, differentiated) currents from the detector 31 to low impedance voltages suitable for communication through flexible shielded cables. These cables connect the translator to the signal processing circuit (board) sp, mounted on a stationary machine part (preferably in OMM mainframe card cage as workers will appreciate). The cable signals are received by two differential-input line receivers R, R'; and the voltage outputs from these amplifiers (each proportional to a respective current output from a respective port of the lateral cell) are applied to a sum/difference stage to produce mirror-feedback control signals ($s_g$). Thus, for a given amount of light on detector 31, the difference in these voltages indicates mirror position, (output signals $_g$).

The LED tends to decrease in brightness as it ages and this would cause a reduction in output scale factor. The "difference-divided-by-sum" circuit ($A_D$, SA, AD) is included to compensate for this LED aging and also to make the output immune to fluctuations in light intensity, (divide circuit comprising a multiplier used in the feedback loop of an opamp). This will minimize "scale factor" errors [such can also result from variance in power, radiation intensity to cell 31].

Workers will understand that enclosure 2 and unit GU (FIG. 3) are preferably mounted, as mentioned, to be translated for rough-track-positioning as known in the art. Thus, to minimize the inertia of the translator, the size and weight of the assembly are kept small, and only the circuitry necessary to preamplify the detector signals is carried in the mu-metal enclosure.

Figure 9B:
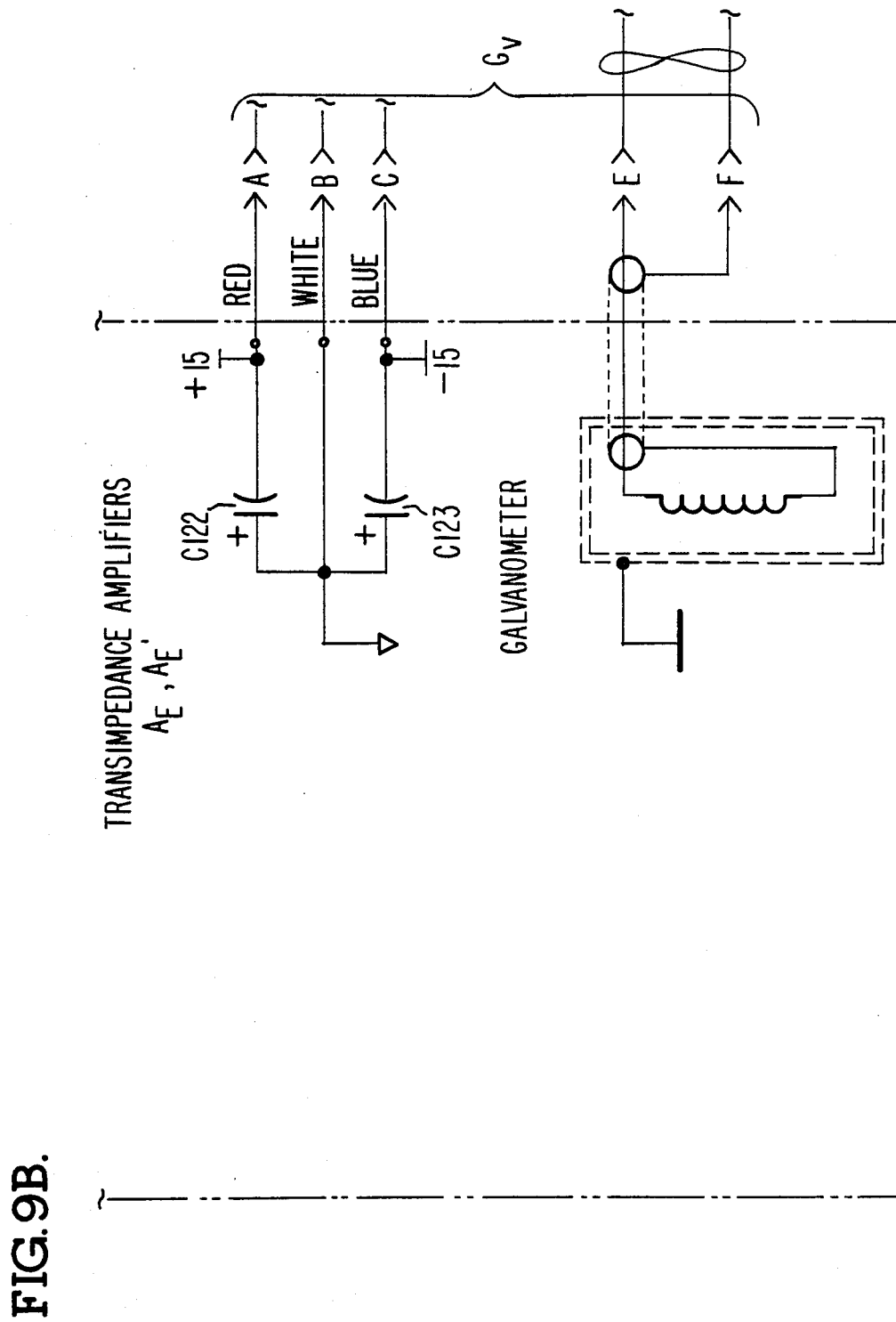

FIG. 9 is a schematic diagram of the portion of the circuit carried on the translator. The preferred transimpedance amplifiers (e.g., type LM101A op amps) are selected for their inherently-low offset voltages. To shield components from magnetic and electrical crosstalk from the galvo coil, parts are located as close to the detector element as possible and preferably behind it. Inputs to the op amps are extended to the detector with twisted wire pairs in order to "common mode" the induced currents. Bias balancing resistors are connected at the detector's ground point so that this ground path appears indentical to the signal path from the detector. Outputs received similar treatment: Two twisted-pair, shielded cables are used with the "low" or reference lead in each cable connected to the same detector ground point and the shields connected to power supply ground. To further reduce crosstalk, a laminated mu-metal and copper shield are placed around the galvo and connected to supply ground.

Figure 10:
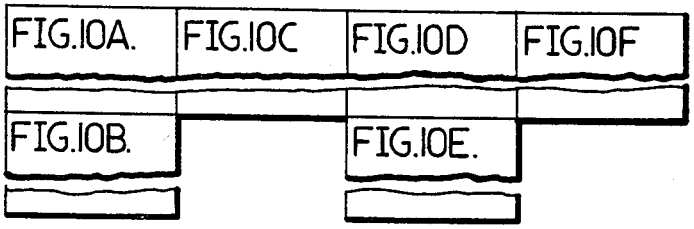
Figure 10A:
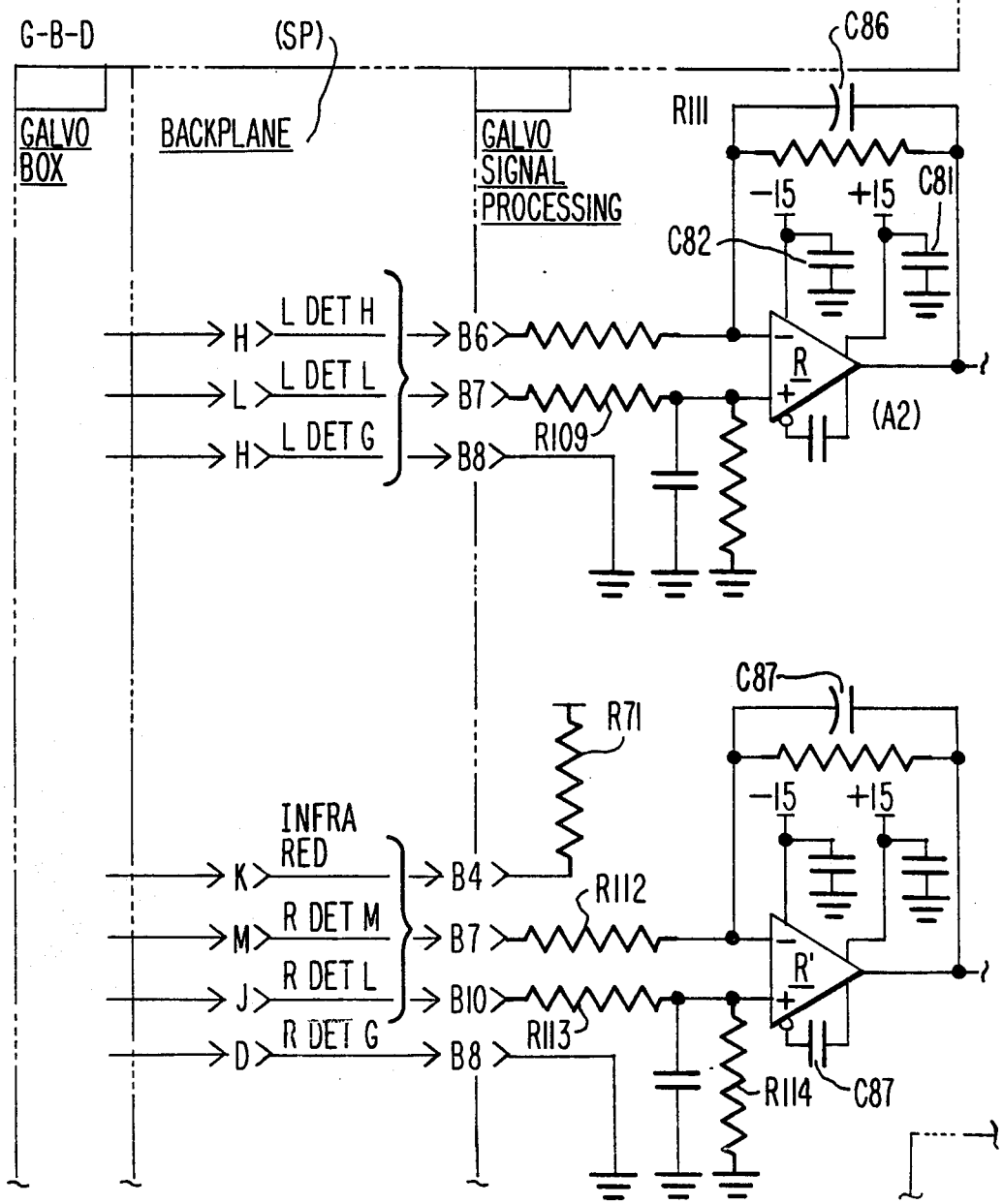
Figure 10B:
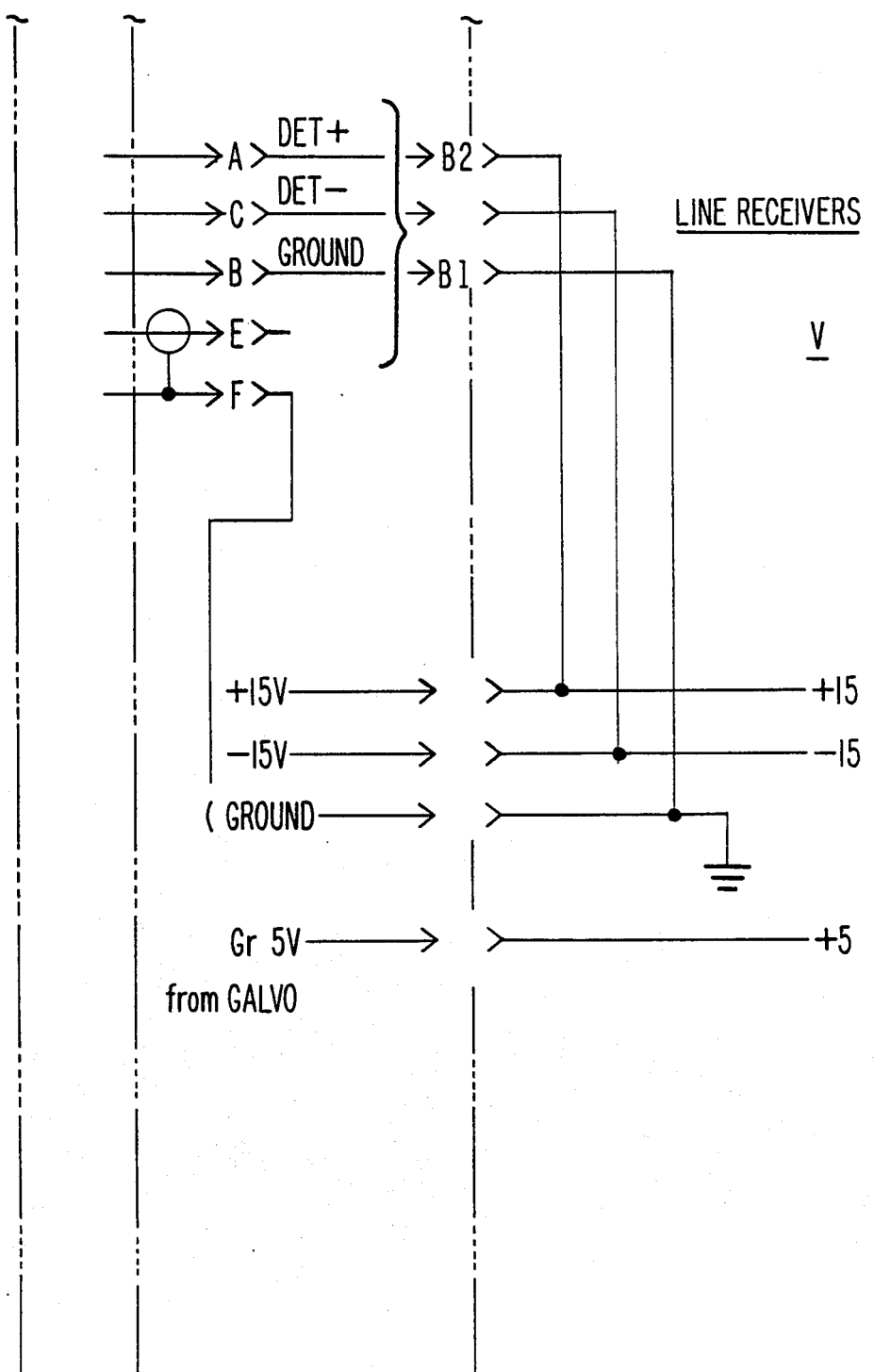
Figure 10C:
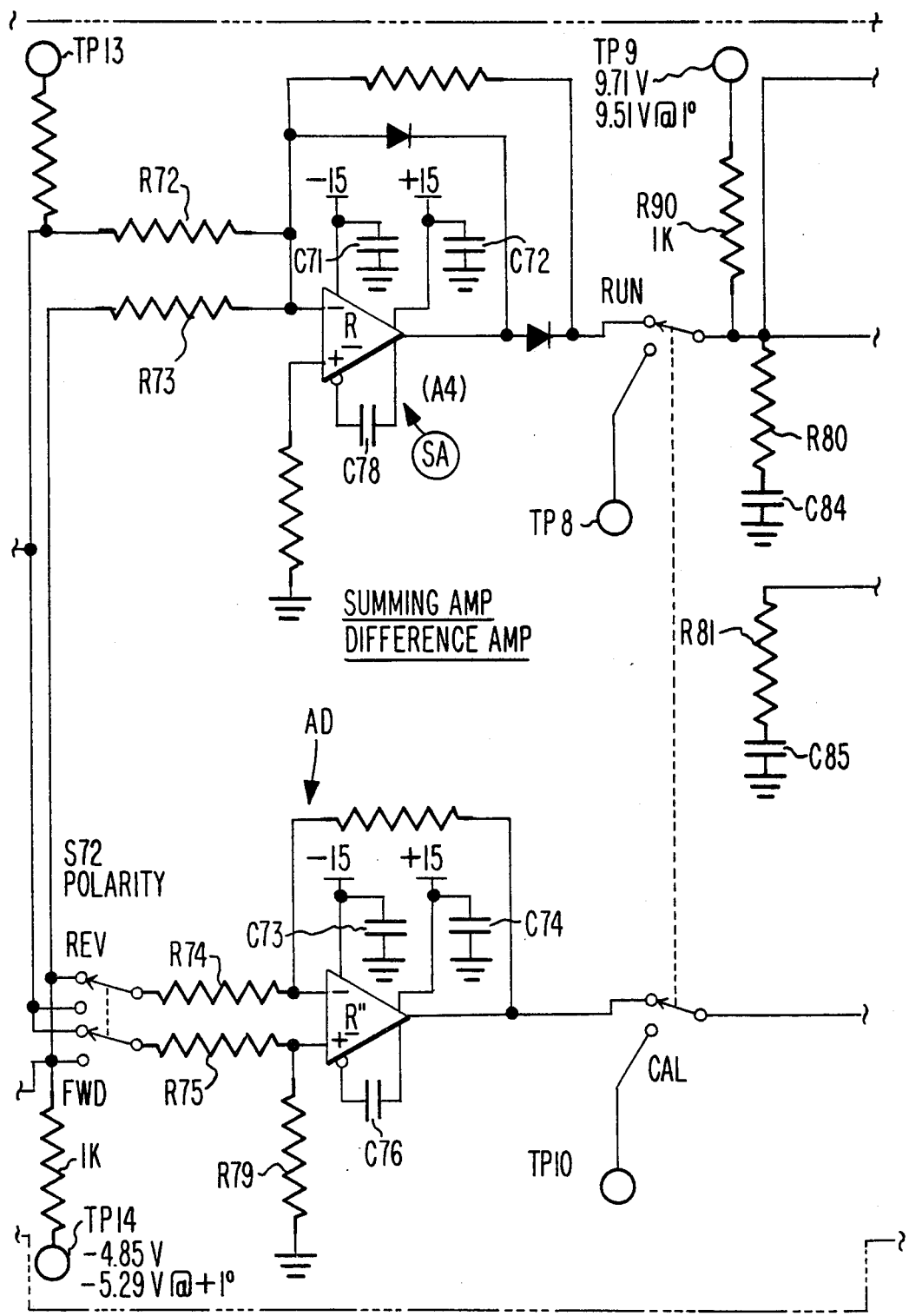
Figure 10D:
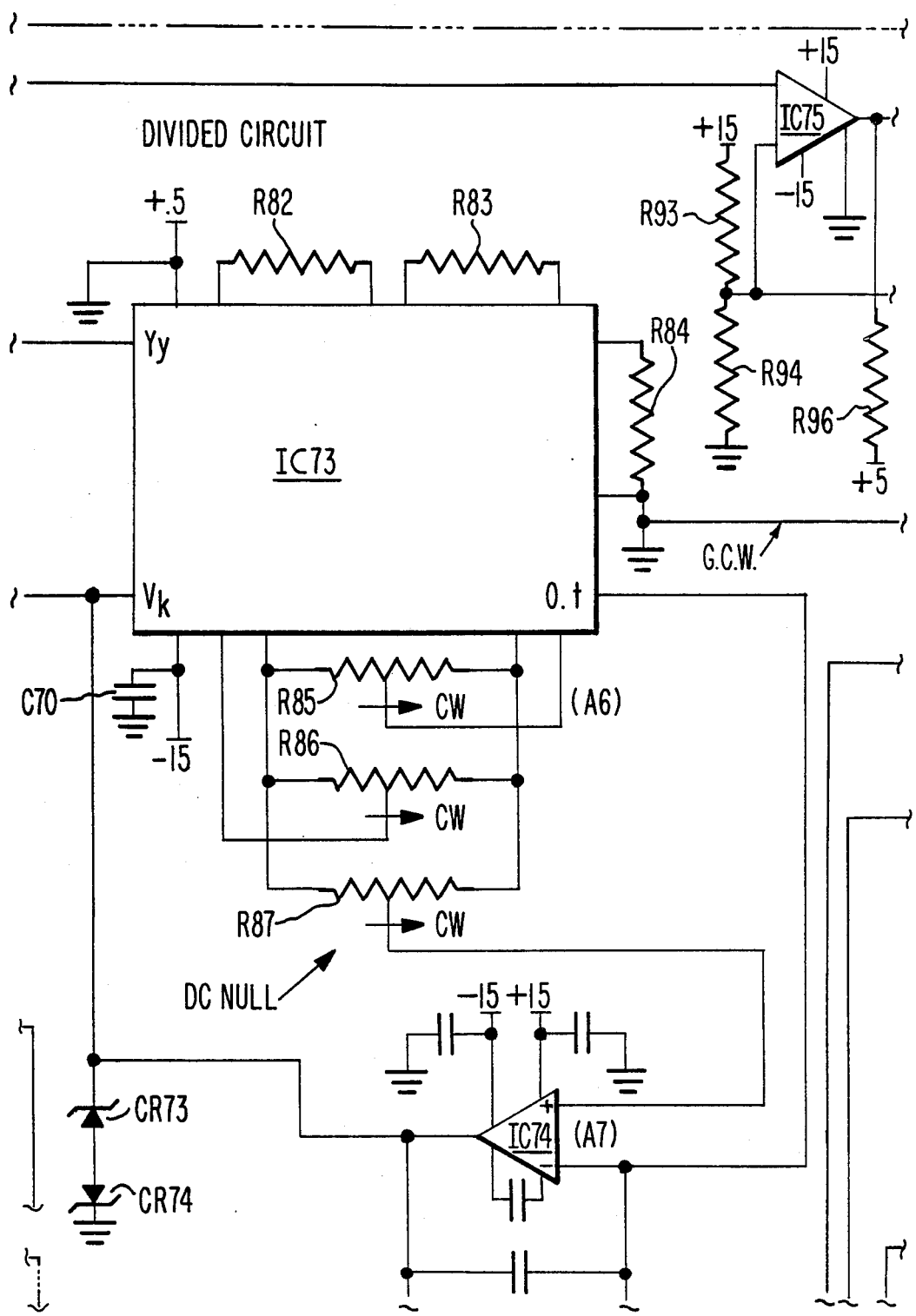
Figure 10E:
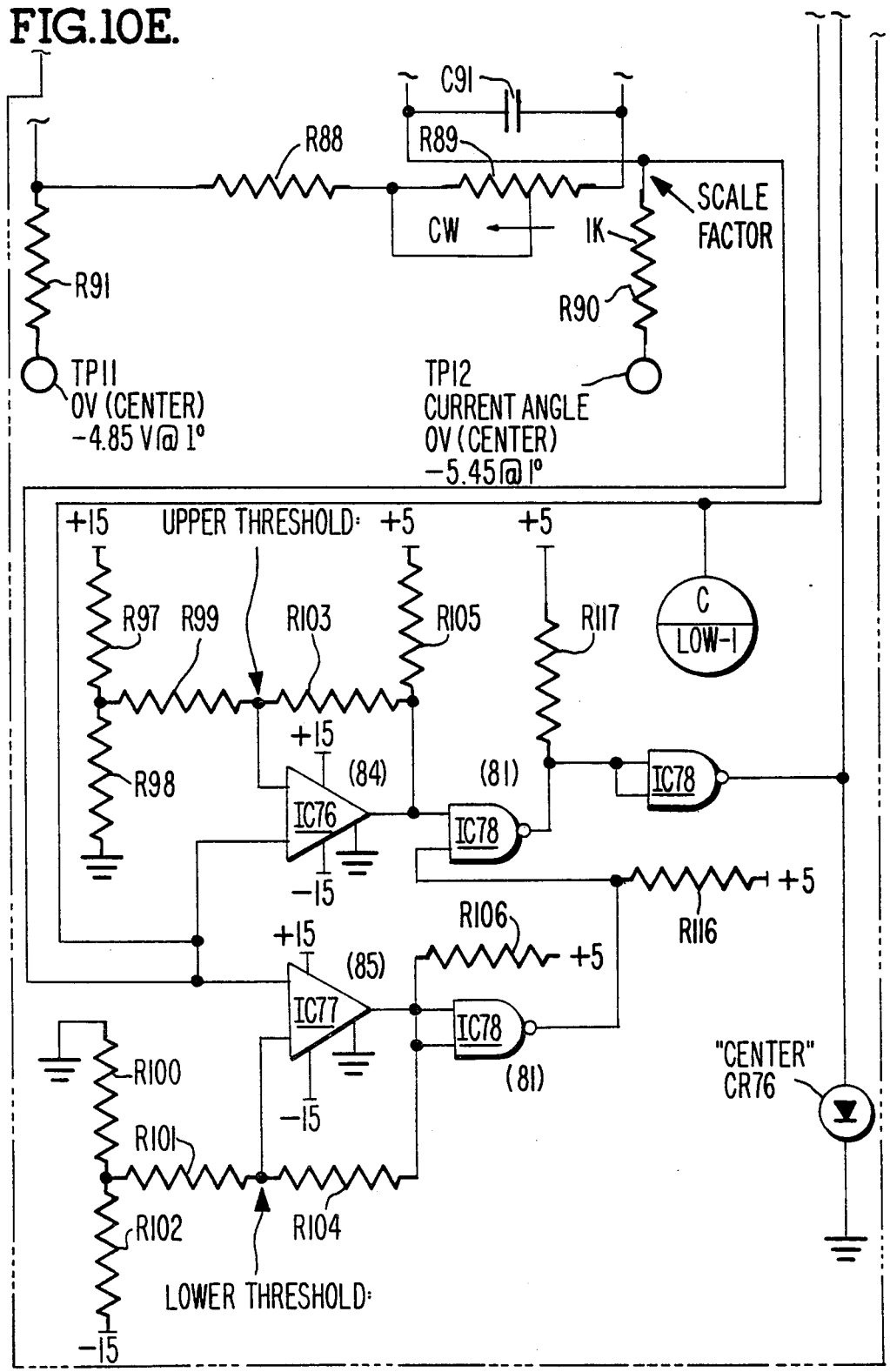
Figure 10F:
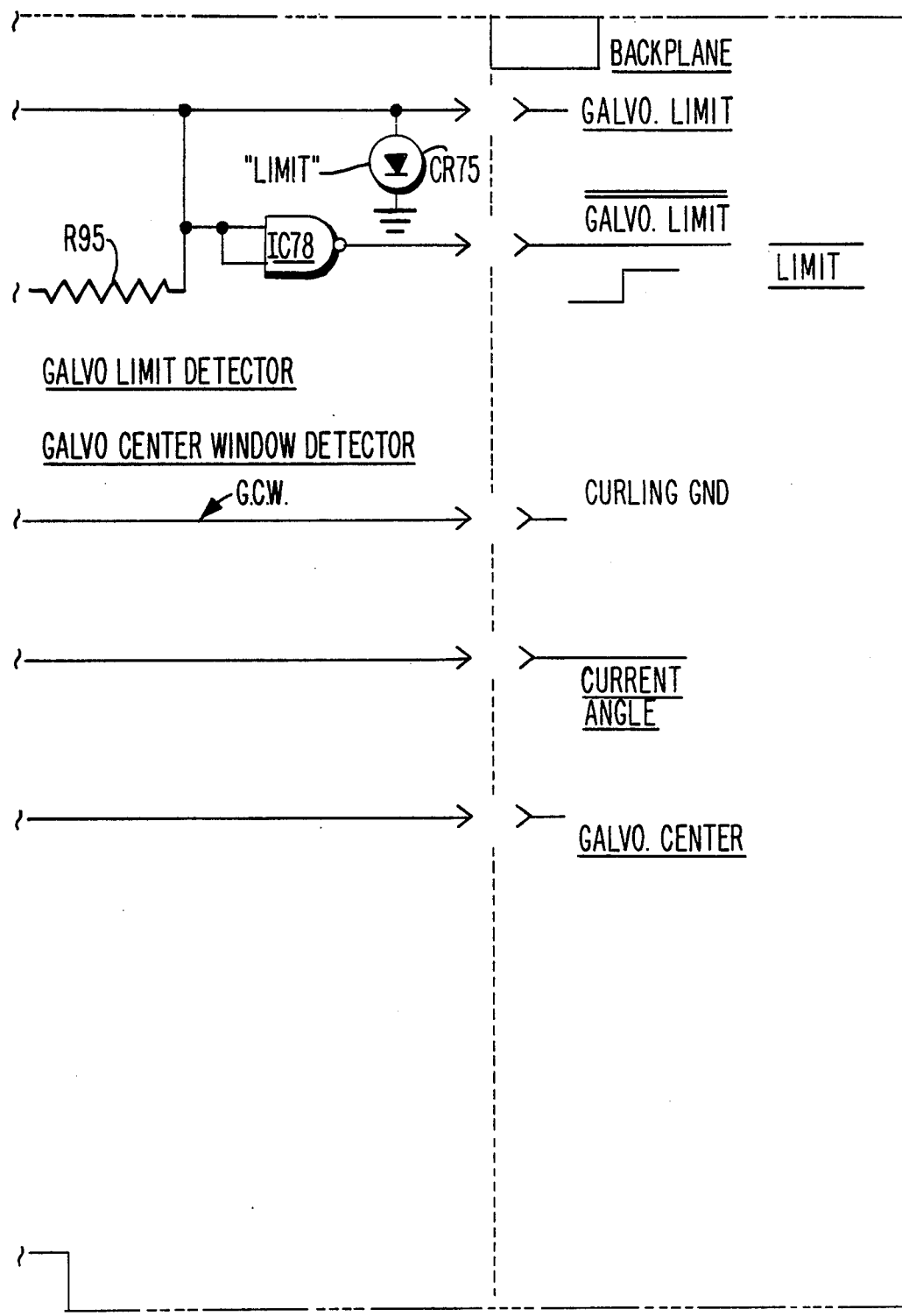

FIG. 10 shows the preferred signal processor circuitry sp. All op amps are type LM101A with power supply decouplers and compensation capacitors, giving each op amp a prescribed gain bandwidth product (e.g., 0.7 MHz). The differential line receivers have suitable gain (e.g., 12 dB) and bandwidth (e.g., 31 KHz) to minimize noise. A polarity reversal switch S72 is included for convenience when used with a control loop.

The "difference-divided-by-sum" circuit consists of difference amp $A_D$, summing amp SA, analog multiplier/op amp AD. The difference amp and "summer" are both straightforward as workers know. Analog division is realized by placing the multiplier (preferably #MC1494 by Motorola—see also "Motorola Linear I.C.", second printing 1978) in the feedback path of the op amp. When this configuration is used, it is necessary to prevent $V_y$ from going negative which would result in a positive feedback condition. To accomplish this, a positive rectifier circuit is combined in the summing amp SA.

Associated with the divider circuit are trimpots R85, R86 and R87 which null out DC offsets in the divider. R88 and R89 establish divider scale factor; R89 may be adjusted to give the desired number of volts per degree. Switch S71, when placed in the "CAL" position, provides a signal injection point for divider calibration. Zener diodes are used to protect the inputs of the analog multiplier. Likewise, R80, C84, R81 and C85 are included to prevent oscillations.

The output of the divider section is the CURRENT ANGLE output which satisfies the machine objective. There are also two TTL outputs used for system diagnostics, as described below:

Type LM311 voltage comparators IC-76 and IC-77 and open collector NAND gates form a window detector with thresholds set at $+15$ mV and $-15$ mV and hysteresis set at 15 mV to eliminate chattering. When the galvo mirror is at center position, the IC-77 output is low and the IC-76 output is high (TTL levels), causing the GALVO CENTER output to go high.

The GALVO LIMIT output prompts the central control system that for whatever reasons the total light falling on the detector is below a minimum acceptable value. This could be caused by excessive galvo mirror angles or by an IRED failure. IC-75 is an LM311 voltage comparator which uses as its input the output of summing amp SA.

If all tolerances were allowed to accumulate in the same direction, the output of the circuit would carry a certain mV offset. Fortunately, this can be nulled at a given ambient temperature by adjusting the optical alignment. To minimize drift caused by temperature, the transimpedance amplifiers were specially selected to have offset voltage drifts in the same direction with temperature.

Figure 11:
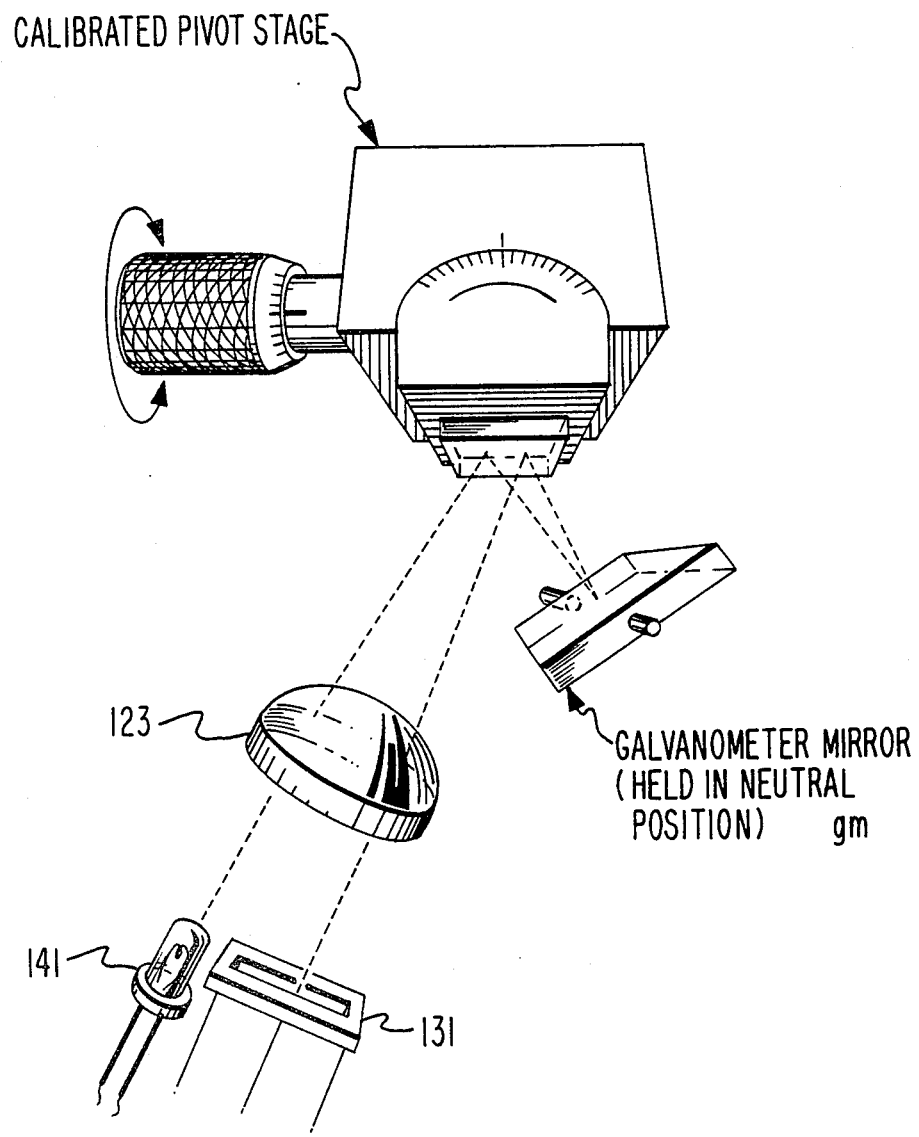
FIG. 11 is a schematic of a test array for testing linearity of such an embodiment.

The accuracy and linearity of the system can be tested by substituting a calibrated angular tilt stage (see FIG. 11), for the reflector; since the pivoting stage's mirror reflects the infra-red beam twice, every degree of tilt corresponds to two degrees of pivot from the galvo. Circuit output (CURRENT ANGLE) may then be plotted against the angle of the substitute reflector.

Requirements of the servo system in which this feedback element was used called for a gain at zero-crossing of 10-8-9 volts per degree of mirror deflection. The linearity test was performed at a reduced scale factor so that a larger mirror deflection could be tested without saturating the output op amps.

Linearity can be brought to within ±5% of the straight-line extension tangent to the curve at zero crossing. However, quality diminishes toward the extremes of the angle range because of the distortion and light loss in the optics.

System bandwidth may be tested two ways: (1) Drive the galvo coil with a sinewave while monitoring CURRENT ANGLE output, or (2) modulate the IRED and measure the output from the summing amp, A71.

Method (1) has the advantage of being direct. However, the galvo has second-order response characteristic which must be accounted for (e.g., notably a 40 dB per decade roll-off commencing at 50 Hz which attenuates high frequency signals to the noise floor before the bandwidth limit is reached).

Method (2) bypasses the galvo mirror and allows a bandwidth measurement of all stages except the difference amp and divider. Overall bandwidth is limited by the differential line receivers.

Figure 12:
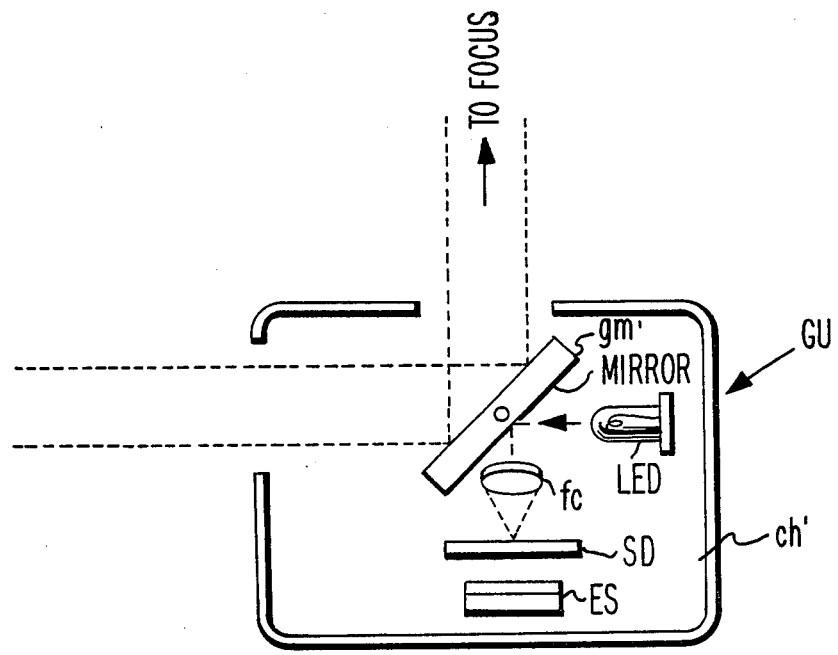
Figure 13:
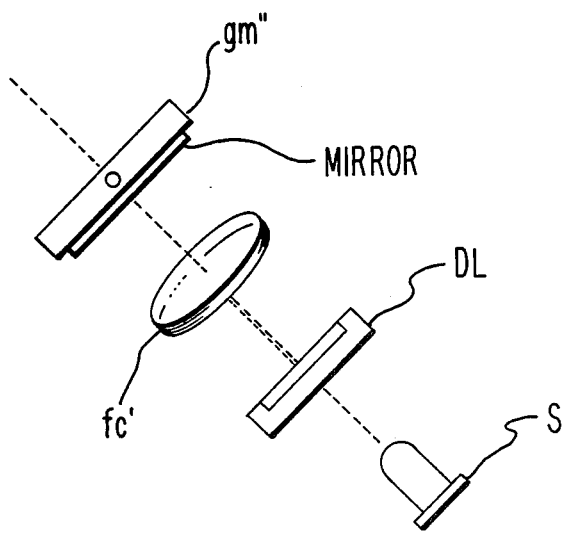
FIG. 13 is a simplistic view of a further modification thereof.

Modified embodiments, FIGS. 12, 13:

FIG. 12 illustrates an arrangement GUU essentially like that of FIG. 2 (GU) except as otherwise indicated. Here, the galvo mirror $g'_m$ is modified so that its "back side" (opposite that optimized to reflect laser image, e.g., at 633 nm) is provided with reflector means $M_{ir}$ adapted to optimally reflect monitor radiation from a source LED (e.g., IR-LED at 940 nm with built-in lens as known in the art). This (IR) illumination is to be focused by focus means fc and detected at detector sD (e.g., preferably to split-cell (bi-cell) detector as known in the art). A light shielding enclosure ch' is used as before to house the components. Preferably the monitor-optics are adapted to increase detect signal (e.g., larger lens; close to $M_{ir}$) and to decrease noise (e.g., total shielding from laser image and other stray illumination), thus enhancing S/N.

Also, the electronics package es' (e.g., pre-amps) is preferably disposed to be magnetic shielded behind detector sD, reducing interference by flux from coils of galvo mirror $g'_m$, this being weakest along a path normal to coil-winding, of course).

FIG. 13 is similar except that a related source S and detector D are disposed in relatively the same direction. Here, as in the arrangement of FIG. 12, use of a lens compact package and larger lenses can reduce any optical distortion that may occur (e.g., in the linearity of the system because the image of the IRED "vignettes" as the monitor-beam swings off-center).

Also, the arrangements of FIGS. 12, 13 have featured "segmented position sensors" (SPS) as opposed to the "lateral cell" aforedescribed, (each being a form of silicon photodiode well known in the art) as workers know.

Segmented position sensors of the quadrant and bi-cell variety exhibit the greater position sensitivity and resolution but have dynamic operating ranges which are limited to the dimensions of the optical image focused onto the detector. Segmented cells require uniform illumination intensity in the spot to achieve good linearity. They can operate at bandwidths of well over 100 megahertz as may be required in pulsed and high-speed tracking applications.

One form of sps is a quadrant detector: a monolithic structure with four distinct separated active areas (anodes); and a cathode common to all four regions.

The simplest use of a quadrant detector involves imaging a uniform spot of light onto the detector in such a way that the center of the detector is included within the light spot. Photo-generated currents are thereby induced in each of the four active regions and flow into the external circuit. The magnitude of the current flowing from each quadrant is proportional to the integrated light flux falling on that quadrant. Presuming a uniform light intensity, the difference between signals from opposite quadrants, divided by the sum of currents from opposite quadrants, yields a normalized transfer function specifying the position of the spot centroid as a fraction of the overall operating range.

The operating range for the above mode of operation is equal to the radius of the light spot. When the light spot is more than a radius away from center, all four quadrants are no longer illuminated and the transfer function no longer represents the analog spot position.

A single-axis cousin of the quadrant detector is the "bi-cell". This segmented position sensor has only two active areas and indicates the position of a light spot with respect to the boundary between these active areas. Signal processing is performed in the same manner as for the quadrant detector. An example of a bi-cell is Silicon Detector Corporation's SD-113-24-21-021 which is housed in a TO-5 package. The active area containing both anodes is about 0.1×0.1 inches.

The linearity of a segmented detector would actually be quite good if a light spot of perfectly uniform intensity were used. Most practically realizable light spots, however, have more of a gaussian intensity distribution and may exhibit any number of other abberations. Consequently, segmented detectors often deviate greatly from the ideal linear transfer characteristic. Segmented detectors are used most successfully in nulling applications where a very sensitive measure of small diviations about zero are required.

Exemplary Optical R/W system (FIGS. 14–20):

FIGS. 14–20 show a representative optical record/read system apt for using the subject invention. This system will be seen to include a "galvo unit" like that described, this unit including a galvo mirror mounted on translator stage. Together these accommodate the necessary radial beam scanning to correct for disk runout and to enable track selection within the field of view of the lens. Disk runout correction duty and track-seek functions are shared to optimize translator position using "track-follow" and "track-seek" operations. As mentioned, it is necessary to communicate to the control system a feedback signal indicating the angular position of the galvo mirror. Such a control system is also used to reduce the effects of cross-coupling between focus motor and galvo.

The translator may be viewed as used mainly for "coarse track-seek" duty, especially since it is relatively heavy and slow-response (it carries the galvo coils, etc., plus the focus means. Conversely, the light galvo mirror can provide quick response (over a limited track span—e.g., about 30 tracks, each about 0.2 microns or $8\times10^{-6}''$ wide), typically, the galvo will probe "ahead" of the translator, with position-error signals fed to the translator so it may "catch-up" after the galvo has located the "target track" as workers well know.

Figure 14:
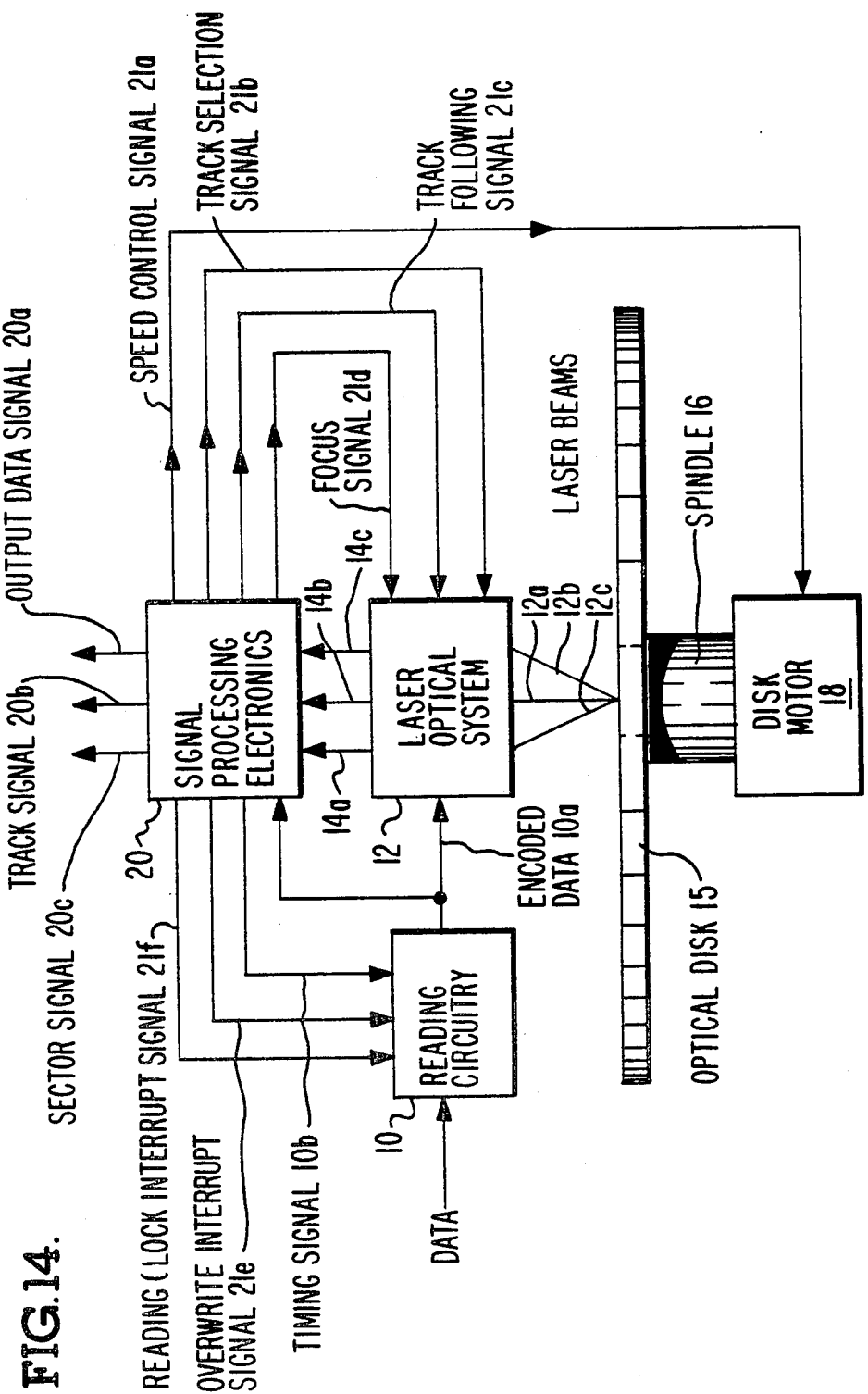
FIG. 14 is an overall block diagram of an optical recording and reproducing system incorporating a preferred embodiment of the present invention.
Figure 15:
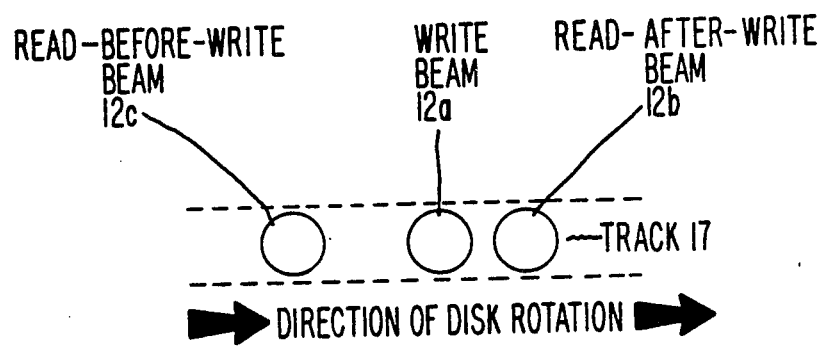
FIG. 15 illustrates the relative locations of the three laser beams provided by the system of FIG. 14 when focused on a selected track of the optical disk.

FIG. 14 generally illustrates the basic portions of a preferred optical recording and reading system apt for using the present invention. The data to be recorded is first applied to recording circuitry 10 which encodes the applied data using, for example, a conventional encoding format of the type employed for magnetic recording, such as non-return-to-zero, return-to-zero, etc. Conventional error checking may also be provided for the encoded signal.

The encoded data 10a from the recording circuitry 10 is applied to a laser optical system 12. The laser optical system 12 generates three laser beams 12a, 12b and 12c which are focused at spaced locations along the center line of the same selected track of a preformatted optical disk 15 supported on a precision spindle 16 for rotation by a motor 18. The optical disk 15 may, for example, be a trilayer disk of the type disclosed in the aforementioned U.S. Pat. No. 4,222,071.

Laser beam 12a is a writing beam which is modulated by the encoded data so as to form optically detectable changes in a selected track of the optical disk 15 representative of the encoded data. It is to be understood that the optically detectable changes produced in the disk by the write laser beam 12a need not be physical changes, such as pits or physical holes. The only requirement is that optically detectable changes be produced in selected areas of the disk in response to the write laser beam 12a which are representative of the encoded data 10a. For the purpose of this description, all of the possible types of optical changes that can be produced will hereinafter be referred to as "optical holes".

Laser beams 12b and 12c shown in FIG. 14 are reading beams. As typicaly illustrated in FIG. 15, the reading beam 12b is a read-after write beam which is accordingly focused behind the writing beam 12a on the center line 17a of a selected track 17, while the reading beam 12b is a read-before-write beam and is accordingly focused ahead of the writing beam 12a. The read beams are reflected from the disk 15 back to the optical system 12 which, in response thereto, derives a plurality of detection signals 14a, 14b and 14c which are applied to signal processing electronics 20. The signal processing electronics 20 uses these detected signals 14a, 14b and 14c to provide an output data signal 20a corresponding to data read from the optical disk 15, along with the signals 20b and 20c respectively identifying the track and sector locations on the disk from which the data is read.

The signal processing electronics 20 also produces control signals 21a, 21b, 21c, 21d and 21e, 20f for use in providing precise control of disk rotational speed, beam focusing and track following. More specifically, control signal 21a is applied to the optical disk motor 18 to provide accurate speed control during recording and reading; control signal 21b is applied to the laser optical system 12 for controlling the radial position of the laser beams 12a, 12b and 12c for the purpose of selecting a desired track; control signal 21c is applied to the laser optical system 12 for providing precise track following of the laser beams on the selected track; control signal 21d is applied to the laser optical system 12 for providing the precise focusing of the laser beams 12a, 12b and 12c; and control signal 21e is applied to the recording circuitry 10 for interrupting recording if the reflected read-before-write beam indicates that the track ahead contains previously recorded data.

Figure 16:
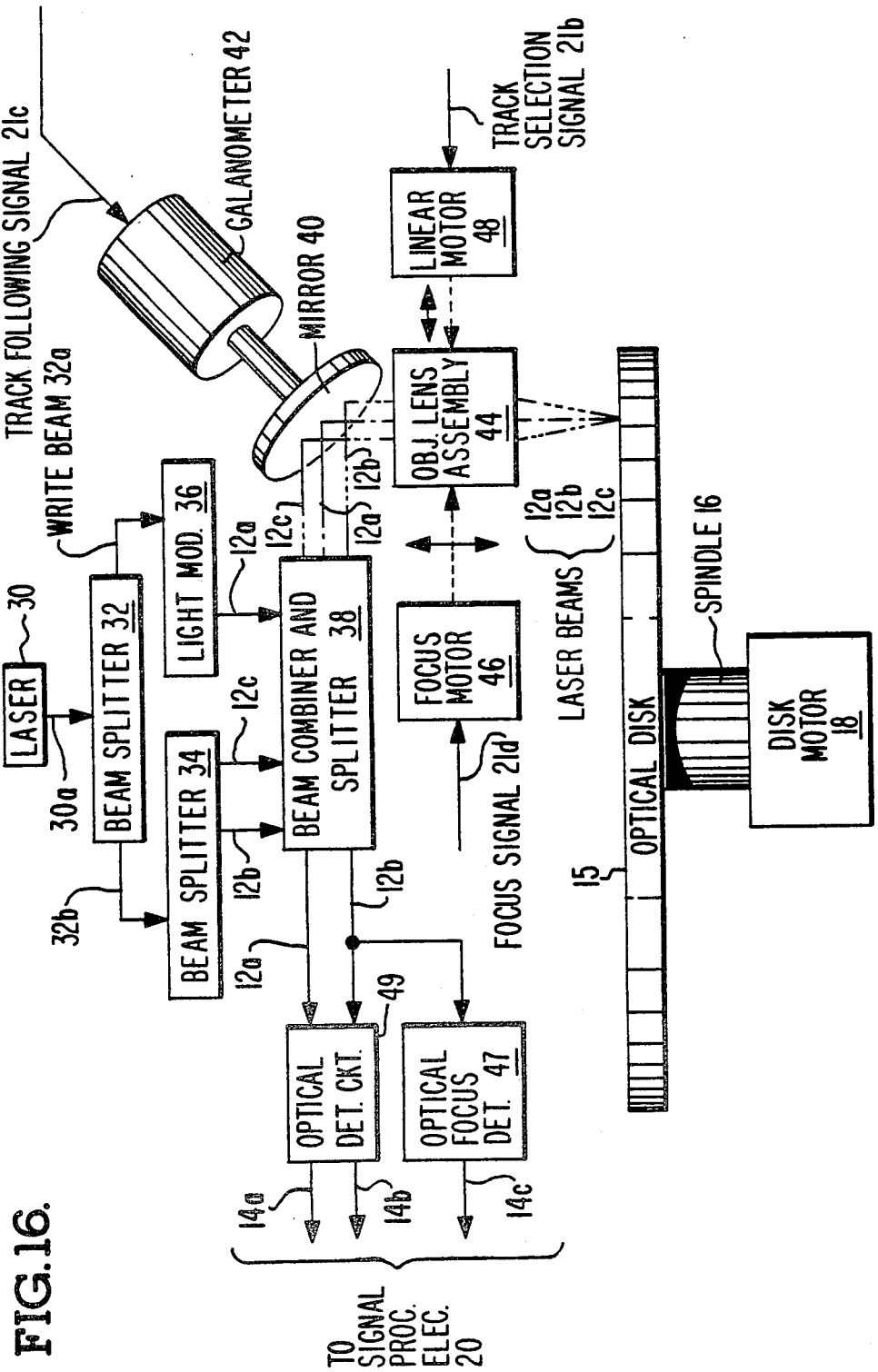
FIG. 16 is a block, schematic representation of the laser optical system shown in FIG. 14.

Reference is next directed to FIG. 16 which illustrates a preferred version of the laser optical system 12 generally shown in FIG. 14. The various components of this laser optical system are illustrated in block and schematic form in FIG. 16 since their implementation can readily be provided by those skilled in the art, as will be evident from the aforementioned references.

As shown in FIG. 16, a laser 30 provides a beam 30a having a wavelength of, for example, 0.633 um and a power level of, for example 12 mW. This laser beam 30a is applied to a first beam splitter 32 which splits the beam into a high power beam 32a and a low power beam 32b. The low power beam 32b is applied to a second beam splitter 34 which further splits the beam 32b to provide read-after-write and read-before-write 12b and 12c, respectively. It is to be understood that a separate laser could be employed for providing one or more of the above beams if so desired.

The high power beam 32a in FIG. 16 is applied to a high speed light-modulator 36 which modulates the beam 32a in response to the encoded data 10a provided at the output from the recording circuitry 10 in FIG. 14. This light-modulator 36 may, for example, be an acous-to-optical digital modulator. The resulting modulated high power beam at the output of the modulator 36 is used as the write beam 12a of the system and is applied to a beam combiner and splitter 38 along with the read beams 12b and 12c which combines the beams taking into account their previously described spacing along the selected track of the disk 15 as typically illustrated in FIG. 15. The resulting three laser beams 12a, 12b and 12c are then reflected off of a mirror 40 mounted to a galvanometer 42. The galvanometer 42 is responsive to the control signal 20d from the signal processing electronics 20 (FIG. 14) so as to cause the mirror 40 to be appropriately deflected as necessary to provide for precise following along the center line of the selected track.

After reflection from the mirror 40, the laser beams 12a, 12b and 12c are then directed to an objective lens assembly 44 mounted on a focusing motor 46. The motor 46 operates in response to the control signal 20d from the signal processing electronics 20 in FIG. 14 to move the objective lens assembly 44 towards and away from the disk 15 so as to thereby maintain accurate focusing of the beams 12a, 12b and 12c on a selected track of the disk. Track selection is provided by controlling the radial position of the beams 12a, 12b and 12c relative to the disk. This is accomplished using a linear motor 48 coupled to the objective lens assembly 44 and responsive to the control signal 20d from the signal processing electronics 20 in FIG. 14.

It will be understood that the two read beams 12b and 12c shown in FIG. 16 are reflected from the disk 15 with a reflected power which is modulated in accordance with the recorded pattern over which the beams pass. The reflected read beams 12b and 12c pass back to the beam combiner and splitter 38 via the objective lens assembly 44 and the mirror 40. The beam combiner and splitter 38 directs the reflected beams to optical detection circuitry 49 which converts the beams into corresponding read-after-write and read-before-write analog electrical signals 14a and 14b which are applied to the signal processing electronics 20 as shown in FIG. 14. Also, at least one of the reflected read beams 12a and 12b is applied to an optical focus detector 47 which provides an electrical signal 14c to the signal processing electronics 20 which is indicative of the quality of focusing of the beams on the selected track.

Next to be considered is the manner in which preformatting is provided for the optical disk 15 in FIG. 14 in accordance with this system. An example of a typical formatting arrangement is illustrated in FIGS. 16 and 17.

Figure 17:
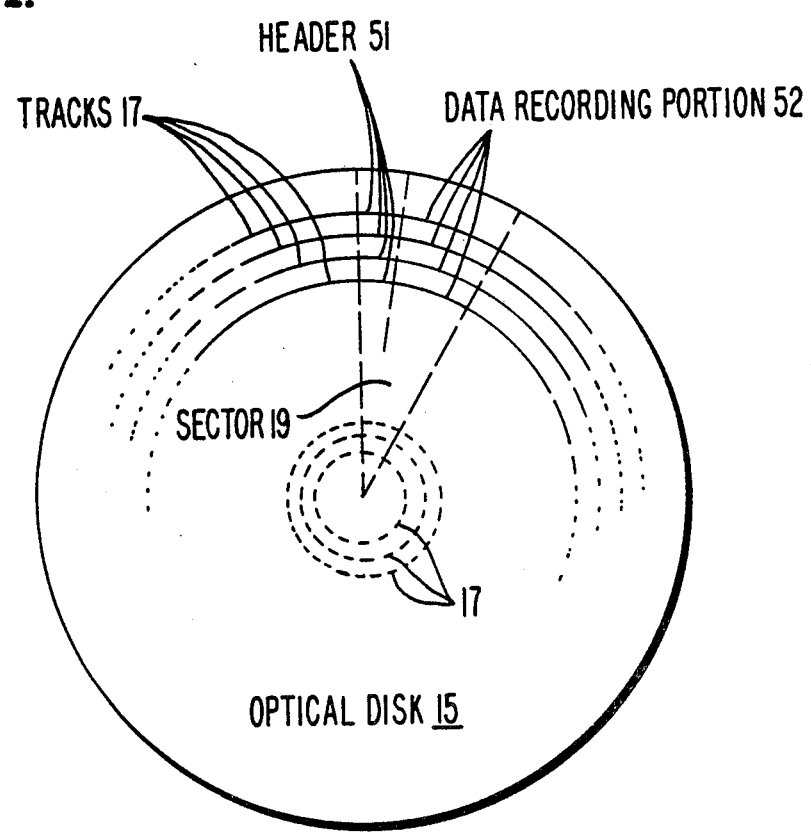
FIG. 17 is a schematic diagram generally illustrating the arrangement and formatting of data on the optical disk.

As generally indicated in FIG. 17, the optical disk 15 in the preferred embodiment being described contains a large plurality of circumferential tracks 17. The disk 15 is also divided into a plurality of sectors 19. As indicated in FIG. 17, each track 17 within a sector 19 comprises a header 51 and a data recording portion 52. The data recording portion 52 is the portion into which data is written during recording and comprises the greater portion of the track length within each sector 19. The header 51 of a track 17 is encountered first in each sector 19 and is provided on the disk prior to recording. The provision of such headers 51 on a disk prior to data recording is typically referred to as "formatting" the disk, and the resulting disk is considered to be "preformatted".

Figure 18:
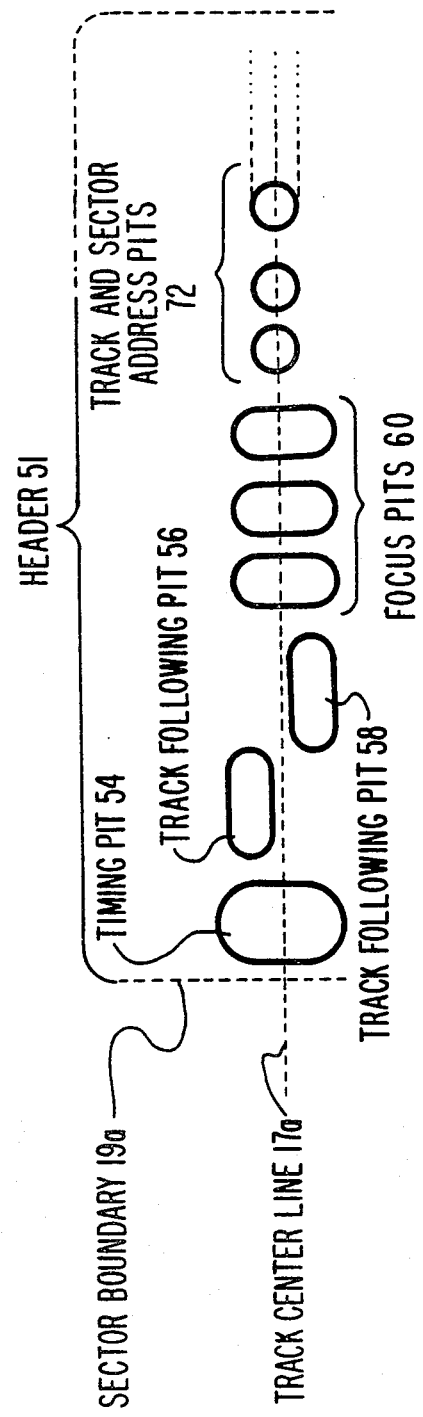
FIG. 18 is a schematic diagram illustrating details of the "header" formatting shown in FIG. 17.

FIG. 18 illustrates an example of a preformatted header 51 provided in accordance with this system for each track 17 in each sector 19 of the disk 15 of FIG. 17. Although the optical holes constituting the header 51 need not be physically observable, as mentioned previously, it will be assumed as an example that physical holes, such as pits, are employed for the exemplary header shown in FIG. 18. It will also be assumed that a pit exhibits a relatively high reflectance to an incident beam while unrecorded disk areas exhibit a relatively low reflectance. It is to be understood that an arrangement may be employed in which a portion of the optical recording, such as the header, is recorded using physical holes, such as pits, and the remaining recorded portions, such as those containing data, are recorded using optical holes. It is additionally to be understood that special purpose recording apparatus may be used for providing headers on a disk (that is, preformatting the disk) which apparatus is different from that used for recording data.

Figure 20:
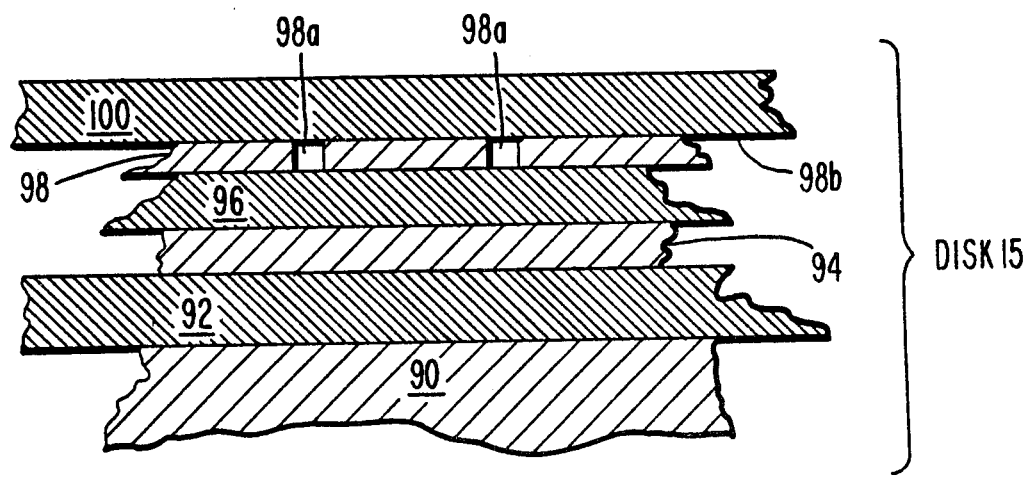
FIG. 20 is a cross-sectional view illustrating the construction of an optical disk apt for employment in the system of FIGS. 1 and 14.

Before continuing with the description of the header shown in FIG. 18, reference is first directed to FIG. 20 which illustrates a cross-section of a disk 15 which may be employed in accordance with the invention. A supporting substrate 90 such as a 0.1 to 0.3 inch thick disk of aluminum is coated with an organic smoothing layer 92 of, for example, 20–60 microns prior to deposition thereon of a highly reflective opaque layer 94 of aluminum which may, for example, have a thickness of 400–800 Angstroms. An inorganic dielectric layer 96 such as a 800–1200 Angstrom layer of silicon dioxide which is transparent at the laser frequency is deposited over the aluminum reflector layer 94. An absorbing layer 98 which is absorptive at the laser frequency is then deposited over the dielectric layer 96. This absorbing layer 98 may for example be a 50 to 300 Angstrom layer of a metal such as tellurium. Finally, the absorbing layer 98 is overcoated with a protective layer 100, such as a silicon resin having a thickness of, for example, 150 to 500 Angstroms.

Still with reference to FIG. 20, an anti-reflection (dark mirror) condition for a laser beam incident on the disk 15 is produced by appropriately choosing the thicknesses and optical characteristics of the layers 94, 96 and 98. Recording on such a disk 15 as illustrated in FIG. 20 is then accomplished by employing an appropriately focused, intensity-modulated recording laser beam (such as laser beam 12a in FIGS. 14–16) which records information by forming pits 98a in the absorbing layer 98 along a selected track, and spacing and dimensions of the pits 98a being representative of the recorded data. Information is read from the disk 15 using an appropriately focused reading laser beam (such as laser beams 12b and 12c in FIGS. 14–16) which is chosen to be of insufficient intensity to affect undisturbed regions 98b of the absorbing layer 98 and has a frequency at which these undisturbed regions 100 exhibit the previously mentioned anti-reflection condition. As a result, the reflected reading beam will be intensity modulated by the pits 98a since the reading beam will experience a relatively high reflection when the beam is incident on a pit 98a, and a relatively low reflection when the reading beam is incident on an undisturbed region 98b. It will be understood that dust particles on the upper surface of the protective layer 100 will be far removed from the focal plane of the optical system so as to have a negligible effect on the above described recording and reading operations.

Reference is now directed back to FIG. 18 for a more detailed consideration of the header 51. Since the header 51 is used in conjunction with the signal processing electronics 20 in FIG. 14 to provide for reliable and precise operation of the system, it will be helpful to describe the construction and arrangement of the exemplary header 51 shown in FIG. 18 in conjunction with FIG. 19 which illustrates a preferred implementation of the signal processing electronics 20 generally shown in FIG. 14. The individual components of FIG. 19 can readily be implemented by those skilled in the art and are thus shown in block form.

Referring to the preformatted header 51 shown in FIG. 18, it will be seen that immediately following the left sector boundary 19a is a relatively large pit 54 providing a relatively large change in optical reflectance which is used to provide synchronized timing for the signal processing electronics 20. This is accomplished by applying the detected read-after-write signal 14a in FIG. 16 to a peak detector 73 via a preamplifier 71. The peak detector 73 outputs a narrow pulse 73a corresponding to the pit 54 which it recognizes as the largest peak in the playback signal. This narrow output pulse 73a produced by the peak detector 73 is then applied as a timing reference to conventional timing circuitry 75 which generates various timing signals 10b, 21a, 75a, 75b, 75c, 75d and 75e for synchronizing the operation of the system with the disk 15. The purposes of these timing signals will become evident as the description proceeds.

Following pit 54 in FIG. 18 are two pits 56 and 58 elongated in a direction parallel to the track 17 and disposed on opposite sides of the track center line 17a in a staggered relationship. These pits 56 and 58 are used to provide precise track following. This is accomplished in FIG. 19 by applying the amplified read-after-write beam provided at the output of the preamplifier 71 to up-down integrator circuitry 77. The up-down integrator circuitry 77 integrates up in response to the detected signal obtained when the read-after-write beam traverses the portion of the track 17 corresponding to the elongated pit 56, and integrates down in response to the signal obtained when the read-after-write beam traverses the portion of the track 17 corresponding to the elongated pit 58. It will be understood that the difference between these two integrations will be a measure of the preciseness of track following by the laser beams. The dimensions and locations of the elongated pits 56 and 58 are chosen in conjunction with the size of the focused beam so that even very small deviations of the beam from the track center line 17a can be detected. This difference provided by integrator circuitry 77 when pits 56 and 58 are traversed during each sector is accordingly used to produce the control signal 21c which is applied to the galvanometer 42 (FIG. 16)

to provide for precise following of a selected track by the laser beams.

Figure 19:
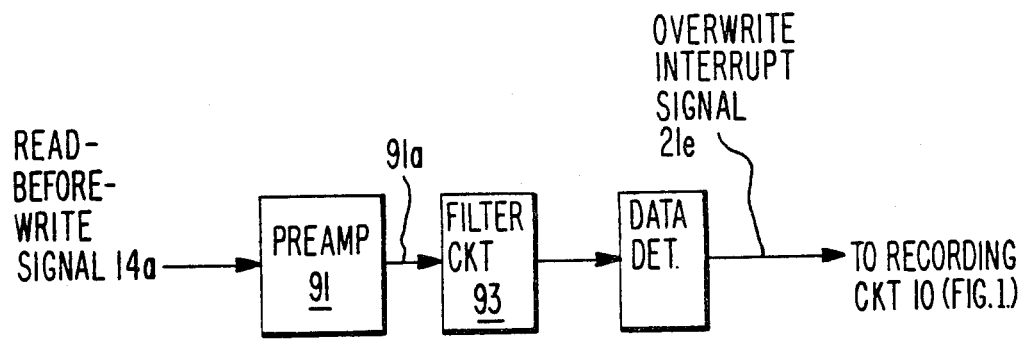
FIG. 19 is a block electrical diagram illustrating a preferred implementation for signal processing electronics apt for use in the foregoing.

It will be noted in FIG. 19 that the timing circuitry 75 provides timing signals 75a and 75b to the up-down integrator circuitry 77. The timing signal 75a is used to delineate the particular times during traversal of the header 51 of each sector for which up and down integrations should be performed so as to appropriately correspond with the locations of the elongated pits 56 and 58. The timing signal 75b is provided during each sector to the up-down integrator circuitry 77 to serve as a hold signal to hold until the next sector the resultant integrated value obtained after the read-after-write beam has completed traversing the second elongated pit 58.

Following the elongated pits 56 and 58 in the exemplary header 51 shown in FIG. 18 are a plurality of pits 60 elongated perpendicularly to the track center line 17a. The locations and dimensions of the pits 60 are chosen so that the reflected signal obtained upon traversing these pits 60 will have a peak value dependent upon the quality of focusing of the incident beam. This may be achieved, for example, by choosing the thickness of each pit 60 so that it is equal to the diameter of a properly focused beam. Then, if the incident beam is larger than the thickness of a pit 60 because of improper focusing, the reflected beam will have reduced power when each pit 60 is traversed, since only a portion of the beam will be reflected. It will also be understood that the spacing between the pits 60 determines the frequency at which the reflected beam is modulated when traversing the pits 60.

Referring again to FIG. 19, it will be understood that the read-after-write beam 14a applied to the preamplifier 71 during the period that the focusing pits 60 are being traversed contains the resulting focusing information. Accordingly, a peak detector 64, which is enabled by timing signal 75c during the period that the read-after-write beam is traversing the focusing pits 60, is provided to receive the amplified read-after-write beam at the output of the preamplifier 71. The peak detector 64 is adapted to respond to the magnitude of the applied signal within a frequency range determined by the spacing of the pits 60 to produce an output signal 64a which is a measure of the quality of focusing.

The output signal 64a from the peak detector 64 is applied to a signal adder 66 along with the signal 14c provided by the optical focus detector 47 in FIG. 16. The signal adder 66 appropriately combines these two signals 14c and 64a to produce the resulting signal 21d shown in FIG. 14 which is applied to the focusing motor 46 for maintaining precise focusing of the incident laser beams on the disk.

The purpose of providing a signal 21d to the focusing motor 46 comprised of the signal 14c from the peak optical focus detector 47 and the signal 64a from the peak detector 64 will now be further considered. It will be understood that, for the disk rotational speeds and recording density contemplated for the preferred system being described, the optical focus detector 47 in FIG. 16 will have a relatively slow response time and will accordingly provide only a coarse control of the focusing distance as the disk rotates. In accordance with the present system, as exemplified here, significantly more precision and reliability are achieved by providing the additional focusing capability made possible using the focusing pits 60 in each header 51 as shown in FIG. 18. As just described, such focusing pits 60 permit deriving a peak-detected signal 64a which will have a significantly greater response time than can be provided by the signal 14c from the optical focus detector 47, thereby providing fast-acting control of focusing for each sector 19 by the focus motor 46 which is designed to provide the appropriate fast response. Of course, as also applies to the track following pits 56 and 58, the header 51 is repeated a sufficient number of times around each circumferential track 17 to obtain the desired precise and fast-acting control of focusing as well as of track following.

Continuing with the description of the header 51 shown in FIG. 18, the above described focusing pits 60 are followed by pits 72 recorded so as to provide an identification of the particular track and sector being traversed by the laser beams. In other words, the pits 72 represent a track and sensor address and conventional encoding can be employed for this purpose, such as is used for identifying tracks and sectors on magnetic disks.

As shown in FIG. 19, the amplified read-after-write signal at the output of the preamplifier 71 is applied along with an appropriate enabling timing signal 75d to a track and sector decoder 78 which provides track and sector signals 20a and 20b respectively (see also FIG. 14) indicating the track and sector being traversed by the laser beams. The track signal 20b is also applied to track selection circuitry 80 along with a track command signal 80a indicative of a selected track to which it is desired that the laser beams be positioned. The track selection circuitry 80 compares the track indicated by the track signal 20b with the track requested by the track command signal 80a and in response thereto produces the signal 21b which is applied to the linear motor 48 in FIG. 16 to center the laser beams over the selected track.

Referring to FIG. 17 along with FIG. 18, it will be understood that, in the exemplary header 51 illustrated, the pits 72 which provide track and sector address identification are the last portion of the header 51. As pointed out previously, the resulting disk containing these headers is considered to be preformatted. Such preformatted disks will typically be provided to users who will make use of the preformatted headers in conjunction with signal processing electronics 20 such as illustrated in FIG. 19 for recording and reading data in the data recording portion 52 of each track 17 in each sector 19.

The amplified read-after-write signal provided at the output of the preamplifier 71 in FIG. 19 is also used during the reading of data from the data recording portion 51 of each sector 19 (FIGS. 17 and 18). Accordingly, the implementation of FIG. 19 includes data read circuitry 82 to which the output of the preamplifier 71 is applied for providing a data output signal 20a (see also FIG. 14) corresponding to the recorded digital data. The data read circuitry 82 is enabled during the time period that the read-after-write beam is traversing the data portion 52 of each sector 19 by the timing signal 75e. The resulting data output signal 20a is applied to an appropriate utilization device (not shown) along with the track and sector signals 20b and 20c which identify the track and sector from which data is read. This reading operation is also performed during data recording to check that data is accurately being recorded.

An additional feature of the present system involves the manner in which the read-before-write beam 12c (FIG. 15) is employed. It will be appreciated that the density of recording made possible by the present invention is quite high. Thus, the possibility exists that an error in positioning of the laser beams may arise during recording which could result in destroying previously recorded data. Such previously recorded data can be very expensive to replace, if not lost forever if there is no back-up. This problem is prevented by the present system by making use of the read-before-write beam 12c.

As illustrated in FIG. 19, the read-before-write signal 14b obtained from the optical detection circuitry 49 in FIG. 16, is applied to a preamplifier 91 whose output 91a is in turn applied to a data detector 95 via filter circuitry 93. The filter circuitry 93 is provided to prevent noise from interfering with the operation of the data detector 95. The data detector 95 is responsive to the presence of recorded data to produce an interrupt signal 95a which is applied to the recording circuitry 10 (FIG. 14) to half recording, thereby protecting previously recorded data. It is to be understood that the read-before-write beam may also be used for other purposes, such as to check the quality of the track prior to recording, or to provide more precise track following and/or focusing control.

Conclusion:

A radiant energy beam scanner/position sensor has been shown to operate using a solid state position detect means (e.g., a lateral cell or a segmented cell) together with fairly common active electronic components. Workers will recognize that one may modify certain aspects. For instance, in a circuit like the embodiment, one may minimize the effects of DC offset in the op amps by using a modulated infra-red beam system. IRED intensity could be modulated at a carrier frequency within the bandwidth of the detector (i.e., 75 KHz). Thus, the signals at the detector outputs would constitute this carrier, amplitude-modulated differentially by mirror position. Synchronous demodulation could be done by a balanced demodulator or by active circuitry as known in the art.

Also, the optical system can be optimized. Larger lenses and a more suitable monitor-beam reflector surface will improve the signal level and linearity. A stronger signal will require less gain, and this can reduce offset and crosstalk, while improving S/N. Improved performance could be realized by increasing the focal length and aperture of the lens. A larger aperture will collect more radiation from the LED (to be sent to the detector). A longer focal length will enable a greater portion of the detector-surface to be used, (e.g., the focal length could be increased in a like embodiment to about 49 mm). And, by using more detector area one can reduce the amplification required and improve signal-to-noise, while reducing both crosstalk and offsets (e.g., a 34 mm lens of 17 mm diameter can yield 9 dB improvement in a like embodiment).

The mechanical layout could be rearranged as shown in FIG. 12. This asymmetrical design allows the first stage amplifiers to be placed closer to the detector and farther from the source of crosstalk. A slightly larger enclosure (ch) and a redesign of the mounting hardware is required for this, of course.

It is advisable to design the mechanical layout so that one may adjust the position of the galvo and the reflector in the course of installing the assembly on the translator. This greatly facilitates optical alignment.

If it is necessary to have a DC level that is very precise (e.g., to minimize offset), then the system can be "shifted-up" in frequency domain. The LED brightness could be modulated at a carrier frequency and the lateral cell outputs synchronously detected. A high carrier frequency will also make the detector circuit relatively insensitive to low-frequency noise (e.g., 120 Hz interference). However, such a scheme will probably dictate that a "higher bandwidth" detector, like the mentioned "segmented element" type.

Since system performance can be impaired by poor infra-red reflectance of the galvo mirror surface, it will usually be preferable to use the back surface of the galvo mirror as the IR reflector (as in FIGS. 12, 13). Then, folding the optics is unnecessary and the front surface of mirror $g_m$ can be kept optimized for laser illumination.

Workers will appreciate how aptly such a radiant-energy position monitor means may be used to control and track the angular orientation of mirrors like these used in optical disk drive apparatus as described. In particular it will be appreciated that such monitor units can be used to improve the efficiency and cost-effectiveness of arrangements using such a mirror and to increase their operating speed—something workers in the art will applaud. Workers will also appreciate that such monitors may be used to track and control other similar movable reflectors in related environments.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to positioning other radiation director means and related reflectors in similar systems and environments. For instance, related embodiments may be employed to position reflectors used with other forms of recording/reproducing systems using different radiant energy—e.g., those in which data is recorded and reproduced holographically.

The above examples of possible variations of the present invention are merely illustrative. Accordingly, the present invention is to be considered as including all possible modifications and variations coming within the scope of the invention as defined by the appended claims.

What is claimed is:

1. In an optical data disk system where a radiant energy information laser beam of prescribed first wavelength is to be selectively positioned by rotatable scan-mirror means, the mirror means being arranged to provide a laser-reflecting mirror surface highly reflective of said laser information beam, and where rotation monitor means is provided to automatically monitor the angular orientation of said mirror means, and provide an output signal reflecting this, said monitor means comprising, in cooperative combination:

reflector means operatively associated with said mirror means to be rotated conjunctively therewith;

source means for providing a radiant energy monitor beam of prescribed second wavelength, being adapted to project this beam to be reflected by said reflector means;

detector means including active extended surface means adapted and disposed to receive said monitor beam whereby the angular rotation of said mirror means is converted to a prescribed linear displacement across this surface means so as to generate position signals representing the relative position of the monitor beam on the surface means; and utilization means adapted to process said position signals and generate said output signal for use in positioning said information beam; the utilization means including amplifying/processing circuit means disposed to be electro-magnetically shielded by said detect means and/or said source means;

said mirror means additionally including reflector means disposed opposite thereto and adapted to reflect said monitor beam from said source means to said detector means so as to represent the angular rotation of said mirror surface during scanning of said laser beam as prescribed linear displacement on said detector surface means.

2. The combination as recited in claim 1 wherein are included optical means intermediate said source means and said detector means, being adapted to convert the angular rotation of said mirror means to linear displacement along said detector surface means.

3. The combination as recited in claim 2 wherein said utilization means comprises a feedback circuit adapted for servo control of the position and/or angular orientation of said mirror means.

4. The combination as recited in claim 2 wherein said detector means comprises a lateral cell.

5. The combination as recited in claim 2 wherein said detector means comprises a segmented cell.

6. The combination as recited in claim 1 wherein said source means comprises an LED source of infra-red radiation and wherein said information beam comprises laser radiation.

7. The combination as recited in claim 1 wherein said mirror means is arranged to provide a mirror surface highly reflective of said information beam, this beam comprising laser radiation; and wherein said mirror means additionally includes reflector means adapted to reflect said monitor beam from said source means to said detector means so as to represent the angular rotation of said mirror surface during scanning of said laser beam as prescribed linear displacement on said detector surface means.

8. The combination as recited in claim 7 wherein said mirror means includes a laser-reflecting surface and said reflector means is disposed opposite thereto.

9. The combination as recited in claim 6 wherein said optical data disk system comprises a "write beam" and two "read beams", all adapted to be projected on a given, selected track of a rotating optical recording disk with a first read beam adapted for "read-before-write" function and the other adapted for "read-after-write" function.

10. The combination as recited in claim 1 wherein said source means comprises an LED unit selected and arranged to exhibit maximum output power consistent with relatively narrow monitor beam profile; wherein said detect means comprises a lateral or segmented cell adapted to provide an output indicative of the relative position of the monitor beam on the active surface thereof; and wherein said detect and source means are packaged to be optically shielded from interference by said laser information beam.

11. The combination as recited in claim 1 wherein said detect and source means are aligned along a relatively common plane.

12. The combination as recited in claim 1 wherein said mirror means is mounted on translator means including carrier means and thereby adapted for controlled reciprocation and positioning in prescribed fashion; and wherein said output monitor signal, as processed by said utilization means, is adapted to provide a servo control for controlling the position of said carrier means as well as the rotation of said mirror means, whereby to controllably scan said information beam across the radius of an associated rotating memory disk.

13. In an optical data disk system where a radiant energy information beam of prescribed first wavelength is to be selectively positioned by rotatable scan-mirror means, and where rotation monitor means is provided to automatically monitor the angular orientation of said mirror means, and provide an output signal reflecting this, said monitor means comprising, in cooperative combination:

reflector means operatively associated with said mirror means to be rotated conjunctively therewith;

source means for providing a radiant energy monitor beam of prescribed second wavelength, being adapted to project this beam to be reflected by said reflector means;

detector means including active extended surface means adapted and disposed to receive said monitor beam whereby the angular rotation of said mirror means is converted to a prescribed linear displacement across this surface means so as to generate position signals representing the relative position of the monitor beam on the surface means; and utilization means adapted to process said position signals and generate said output signal for use in positioning said information beam;

said source and detector means being disposed and packaged to be optically shielded from said information beam.

14. The combination as recited in claim 13 wherein said source means comprises an LED adapted to project infra-red radiation as a "spot" image of finite size onto said detector surface means, this surface means being selected and adapted to exhibit a height which at least spans the spot and a length which covers maximum spot excursion during maximum mirror rotation, being long enough to improve signal/noise as desired.

15. The combination as recited in claim 14 wherein said source LED is adapted to project a collimated monitor beam and wherein said detect cell is selected to exhibit minimum drift, and a stable "null position", over prescribed life time and temperature changes as well as to exhibit a relatively brief "rise time".

16. The combination as recited in claim 15 wherein said detect cell is selected and arranged so that a shift in the position of said spot along said active surface length generates a prescribed multiple output indicative of spot position along this length.

17. The combination as recited in claim 16 wherein said detect cell is "segmented physically", such as in a segmented cell.

18. The combination as recited in claim 16 wherein said detect cell is split electrically, such as in a lateral bi-cell.

19. The combination as recited in claim 16 wherein said optical data disk system comprises a "write beam" and two "read beams", all adapted to be projected on a given, selected track of a rotating optical recording disk with a first read beam adapted for "read-before-write"

function and the other adapted for "read-after-write" function.

20. The combination as recited in claim 16 wherein each detect cell output is presented to an amplification channel with these outputs thereafter combined in a Sum-Difference stage to provide an output signal representing position change proportionally on the detect cell as a function of angular rotation of said mirror means.

21. The combination as recited in claim 20 wherein said detect cell comprises a lateral cell providing two outputs, each output being sent to preamplification and differential amplification means and being thereafter combined in said Sum-Difference stage.

22. The combination as recited in claim 21 wherein said source and detector means are packaged with associated optical and circuit means to be shielded from said information beam, with the entire monitor means, being mounted in common with said mirror means on a translator means adapted for reciprocation and controlled positioning of said mirror means in prescribed fashion, said circuit means including pre-amplification means.

* * * * *

UNITED STATES PATENT AND TRADEMARK OFFICE
CERTIFICATE OF CORRECTION

PATENT NO. : 4,466,088
DATED : August 14, 1984
INVENTOR(S) : Paul M. Trethewey

It is certified that error appears in the above-identified patent and that said Letters Patent is hereby corrected as shown below:

Col. 4, line 2, change "$\overset{o}{A}$)" to --A°)--;

line 4, change "$\overset{o}{A}$" to --A°--.

Col. 7, line 32, change "signals $_g$)." to --signal s$_g$).--.

Col. 11, line 26, change "typicaly" to --typically--.

Col. 16, line 17, change "sensor" to --sector--.

Col. 17, line 20, change "half" to --halt--.

Signed and Sealed this

Twenty-ninth Day of January 1985

[SEAL]

Attest:

DONALD J. QUIGG

*Attesting Officer*     *Acting Commissioner of Patents and Trademarks*